(12) United States Patent
Kim et al.

(10) Patent No.: US 11,416,213 B2
(45) Date of Patent: Aug. 16, 2022

(54) ELECTRONIC DEVICE FOR OBTAINING AND ENTERING LACKING PARAMETER

(71) Applicant: SAMSUNG ELECTRONICS CO., LTD., Suwon-si (KR)

(72) Inventors: Joo Yoo Kim, Seoul (KR); Jun Hui Kim, Seoul (KR); Ji Eun Kim, Suwon-si (KR); Tae Ho Kim, Cheongju-si (KR); Dong Hyun Roh, Yongin-si (KR); Hyun Gi Ahn, Seoul (KR); Da Som Lee, Seoul (KR); Seung Eun Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 137 days.

(21) Appl. No.: 16/047,142

(22) Filed: Jul. 27, 2018

(65) Prior Publication Data

US 2019/0034160 A1 Jan. 31, 2019

(30) Foreign Application Priority Data

Jul. 28, 2017 (KR) .......................... 10-2017-0096236

(51) Int. Cl.
*G06F 3/16* (2006.01)
*G06F 3/0488* (2022.01)
(Continued)

(52) U.S. Cl.
CPC ............ *G06F 3/167* (2013.01); *G06F 3/0488* (2013.01); *G06F 3/04842* (2013.01); *G06F 9/453* (2018.02); *G06F 3/016* (2013.01)

(58) Field of Classification Search
CPC ...... G06F 3/167; G06F 3/04842; G06F 9/453; G06F 3/0488; G06F 3/016; H04W 4/025;
(Continued)

(56) References Cited

U.S. PATENT DOCUMENTS 7,885,146 B2 2/2011 Parkinson et al.
9,704,154 B2 * 7/2017 Xing .................. G06Q 20/3278
(Continued)

FOREIGN PATENT DOCUMENTS

CN 103294879 A 9/2013
CN 103565648 A 2/2014
(Continued)

OTHER PUBLICATIONS

Search Report and Written Opinion dated Nov. 2, 2018 in counterpart International Patent Application No. PCT/KR2018/008442.
(Continued)

*Primary Examiner* — Kieu D Vu
*Assistant Examiner* — Blaine T Basom
(74) *Attorney, Agent, or Firm* — Nixon & Vanderhye P.C.

(57) ABSTRACT

An electronic device includes a microphone, a processor, and a memory. The memory stores an application for monitoring user information, and the memory stores instructions that, when executed by the processor, cause the electronic device to record a plurality of parameters associated with the user information in the application when a predefined event occurs to record a first parameter and the first parameter is not recorded in the application, to output a message for obtaining the first parameter, to receive a user response associated with the first parameter, to transmit data associated with the user response to an external server, to receive a first response from the external server, and to record the first parameter in the application by allowing the electronic device to have information about sequences of states of the electronic device. The first response includes information about sequences of states of the electronic device for recording the first parameter in the application.

17 Claims, 23 Drawing Sheets

(51) Int. Cl.
*G06F 9/451* (2018.01)
*G06F 3/04842* (2022.01)
*G06F 3/01* (2006.01)

(58) Field of Classification Search
CPC ......... H04M 2250/10; H04M 2250/12; H04M 1/72572; H04M 1/72569; H04M 1/72566; H04M 1/72552; H04M 2250/06; H04M 2250/22; H04M 2201/34; H04M 2201/36; H04M 1/72522; H04M 2201/40; H04L 67/18; H04L 67/28; H04L 67/125; H04L 67/12; G10L 15/22; G10L 2015/223; G10L 15/30; A61B 5/02; A61B 5/0205; A61B 5/04; A61B 5/68; A61B 5/00; A61B 5/0002; A61B 5/14507; A61B 5/02055; A61B 5/681; A61B 5/0024; A61B 5/746; G16H 10/00; G16H 10/60
See application file for complete search history.

(56) References Cited

U.S. PATENT DOCUMENTS

| | | | |
|---|---|---|---|
| 9,886,953 | B2 | 2/2018 | Lemay et al. |
| 10,043,520 | B2 | 8/2018 | Mun et al. |
| 10,127,011 | B2 | 11/2018 | Bang et al. |
| 10,265,013 | B2 * | 4/2019 | Lim ..................... A61B 5/6898 |
| 10,388,282 | B2 * | 8/2019 | Chong .................. G16H 40/67 |
| 10,426,399 | B1 * | 10/2019 | Kayyali ............... A61B 5/0022 |
| 10,595,726 | B2 * | 3/2020 | Cronin ................. A61B 5/6831 |
| 2007/0047392 | A1 | 3/2007 | Parkinson et al. |
| 2007/0197878 | A1 * | 8/2007 | Shklarski ........... A61B 5/02055 |
| | | | 600/300 |
| 2014/0046596 | A1 | 2/2014 | Chang et al. |
| 2015/0006202 | A1 * | 1/2015 | Yamato ................. G16H 10/60 |
| | | | 705/3 |
| 2015/0121216 | A1 * | 4/2015 | Brown ................... G06N 3/008 |
| | | | 715/707 |
| 2016/0012187 | A1 * | 1/2016 | Zasowski ............... G06Q 10/10 |
| | | | 705/3 |
| 2016/0012820 | A1 | 1/2016 | Mun et al. |
| 2016/0034253 | A1 | 2/2016 | Bang et al. |
| 2016/0062540 | A1 * | 3/2016 | Yang ................... G06F 3/04817 |
| | | | 345/173 |
| 2016/0140960 | A1 | 5/2016 | Chae |
| 2016/0157780 | A1 * | 6/2016 | Rimminen ............ A61B 5/1115 |
| | | | 600/300 |
| 2016/0260436 | A1 | 9/2016 | Lemay et al. |
| 2016/0364378 | A1 | 12/2016 | Futrell et al. |
| 2017/0039475 | A1 | 2/2017 | Cheyer et al. |
| 2017/0102855 | A1 * | 4/2017 | Kwon ................. G06F 3/04886 |
| 2018/0130470 | A1 | 5/2018 | Lemay et al. |
| 2018/0144100 | A1 * | 5/2018 | Chalas ................... G08B 25/08 |
| 2019/0012142 | A1 | 1/2019 | Bang et al. |

FOREIGN PATENT DOCUMENTS

| | | |
|---|---|---|
| CN | 204336038 U | 5/2015 |
| CN | 104967731 A | 10/2015 |
| JP | 2012-024481 | 2/2012 |
| KR | 10-2016-0016530 A | 2/2016 |
| KR | 10-2016-0062594 | 6/2016 |
| KR | 10-2016-0076264 | 6/2016 |
| KR | 10-2017-0069501 | 6/2017 |
| WO | 2016/144983 | 9/2016 |

OTHER PUBLICATIONS

Chinese Office Action dated Jan. 4, 2021 for CN Application No. 201810840930.6.
Korean Office Action dated Jun. 28, 2021 for KR Application No. 10-2017-0096236.

* cited by examiner

ELECTRONIC DEVICE FOR OBTAINING AND ENTERING LACKING PARAMETER

CROSS-REFERENCE TO RELATED APPLICATION

This application is based on and claims priority under 35 U.S.C. § 119 to Korean Patent Application No. 10-2017-0096236, filed on Jul. 28, 2017, in the Korean Intellectual Property Office, the disclosure of which is incorporated by reference herein its entirety.

BACKGROUND

1. Field

The present disclosure relates to a technology for obtaining and entering a lacking parameter.

2. Description of Related Art

A user terminal such as a smartphone may provide a service associated with the health of a user using an application.

A health application may store a variety of information to provide total services. For example, the health application may store information such as a heart rate or stress index obtained through the sensor of the user terminal. For another example, the health application may store information such as the type of food ingested or the amount of water ingested through user input.

For the purpose of recording (e.g., entering, inputting or registering) missed user information in a health application, a user may directly execute the application and may input the missed parameter, in a conventional electronic device.

SUMMARY

Aspects of the present disclosure address at least the above-mentioned problems and/or disadvantages and provide at least the advantages described below. Accordingly, an aspect of the present disclosure is to input the user information without omission by outputting a message for obtaining the missed parameter when an event defined for each parameter occurs.

An aspect of the present disclosure is to obtain the parameter in consideration of the situation of the user by providing the user with a notification before the missed parameter is obtained.

In accordance with an aspect of the present disclosure, an electronic device may include a housing, a touchscreen display disposed in the housing and exposed through a first portion of the housing, a microphone disposed in the housing and exposed through a second portion of the housing, a speaker disposed in the housing and exposed through a third portion of the housing, a wireless communication circuit disposed in the housing, a processor disposed in the housing and electrically connected to the touchscreen display, the microphone, the speaker, and the wireless communication circuit; and a memory disposed in the housing and electrically connected to the processor. The memory may store an application for monitoring user information, and the memory may store instructions that, when executed by the processor, cause the electronic device to record a plurality of parameters associated with the user information into the application automatically and/or based on a user input, to output a message for obtaining a first parameter through at least one of the touchscreen display and/or the speaker when a predefined event occurs to cause registration of the first parameter and the first parameter is not recorded into the application, to receive a user response associated with the first parameter through the touchscreen display and/or the microphone, to transmit data associated with the user response to an external server through the wireless communication circuit, to receive a first response from the external server through the wireless communication circuit, and to record the first parameter into the application by allowing the electronic device to have information about sequences of states of the electronic device. The first response may include information about sequences of states of the electronic device for importing the first parameter into the application.

In accordance with another aspect of the present disclosure, an electronic device may include a housing, a touchscreen display disposed in the housing, a microphone disposed in the housing, a speaker disposed in the housing, a wireless communication circuit disposed in the housing, a processor disposed in the housing and electrically connected to the touchscreen display, the microphone, the speaker, and the wireless communication circuit, and a memory disposed in the housing and electrically connected to the processor. The memory may store an application for monitoring user information, and the memory may store instructions that, when executed by the processor, cause the electronic device to record a plurality of parameters associated with the user information into the application automatically and/or based on a user input, to perform a part of a sequence of first states for recording the first parameter into the application when an event associated with a first parameter occurs and the first parameter is not recorded into the application, and to transmit information lacking the first parameter in a state where the first parameter is required, to an external server through the wireless communication circuit, to receive a message for obtaining the first parameter from the external server through the wireless communication circuit, to output the received message for obtaining the first parameter, through at least one of the touchscreen display and/or the speaker, to receive a user response associated with the first parameter through the touchscreen display and/or the microphone, to transmit data associated with the user response to the external server through the wireless communication circuit, to receive a response from the external server through the wireless communication circuit, and to perform a remaining part of the sequence of the first states by allowing the electronic device to have sequences of second states. The response may include information about sequences of second states of the electronic device for recording the first parameter into the application.

In accordance with another aspect of the present disclosure, a computer-readable recording medium may store instructions which, when executed by a processor of an electronic device, cause the electronic device to record a plurality of parameters associated with user information in an application automatically and/or based on a user input, to output a message for obtaining a first parameter through at least one of a touchscreen display and/or a speaker when a predefined event occurs to cause registration of the first parameter and the first parameter is not recorded into the application, to receive a user response associated with the first parameter through the touchscreen display and/or a microphone, to transmit data associated with the user response to an external server through a wireless communication circuit, to receive a first response from the external server through the wireless communication circuit, and to record the first parameter into the application by allowing the electronic device to have information about sequences of states. The first response may include information about sequences of states of the electronic device for recording the first parameter into the application.

According to various embodiments of the present disclosure, when a predefined condition is satisfied, since a message is output and then the missed parameter is obtained, the user information may be monitored comprehensively.

According to various embodiments of the present disclosure, since the user information is obtained without (or by reducing) omission, the effective health management service may be provided to a user.

Besides, a variety of effects directly or indirectly understood through the present disclosure may be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Hereinafter, various embodiments of the present disclosure will be described with reference to accompanying drawings. However, those of ordinary skill in the art will recognize that modifications, equivalents, and/or alternatives of the various embodiments described herein can be variously made without departing from the scope and spirit of the present disclosure.

Prior to describing example embodiments of the present disclosure, an integrated intelligent system to which the present disclosure is capable of being applied will be described in detail with reference to various diagrams.

Figure 1:
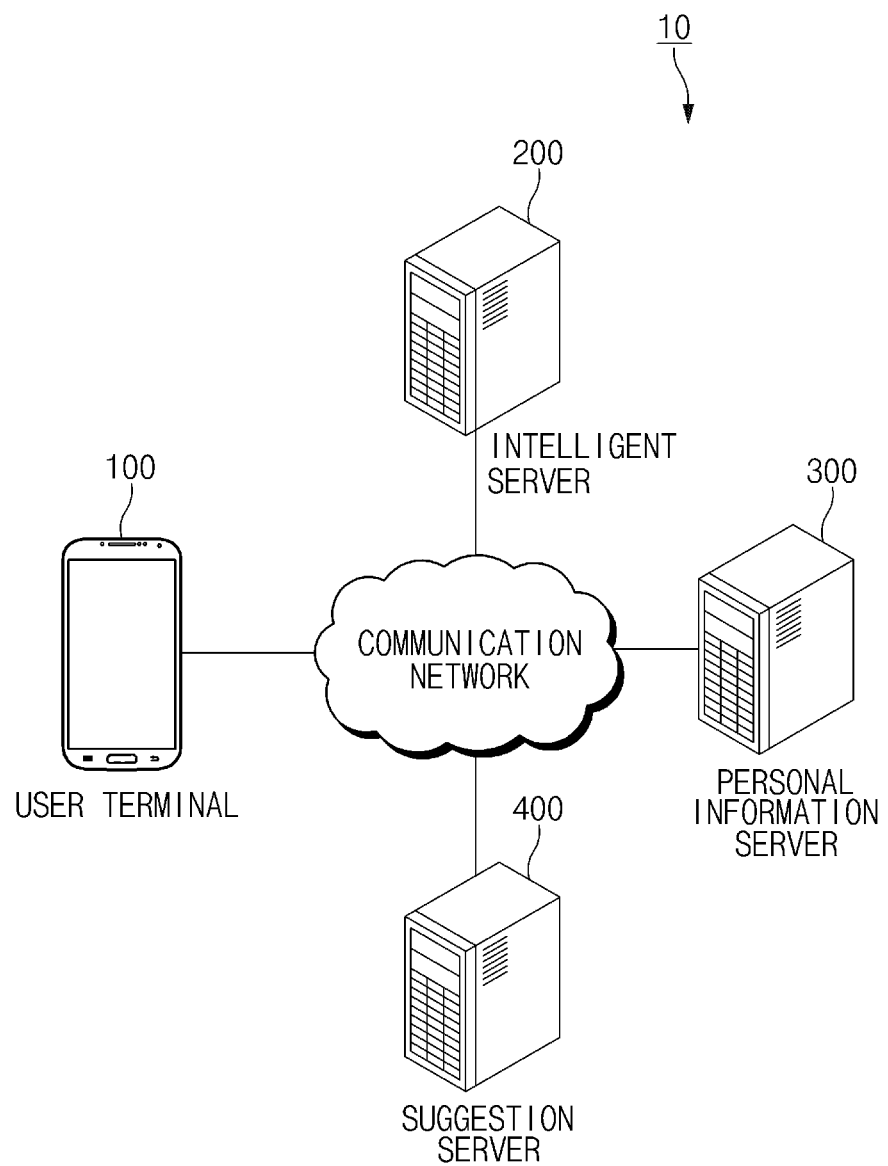
FIG. 1 is a diagram illustrating an integrated intelligent system, according to various embodiments of the present disclosure.

FIG. 1 is a diagram illustrating an integrated intelligent system, according to various embodiments of the present disclosure.

Referring to FIG. 1, an integrated intelligent system 10 may include a user terminal 100, an intelligent server 200, a personal information server 300, and/or a suggestion server 400.

The user terminal 100 may provide a service necessary for a user through an app (or an application program) (e.g., an alarm app, a message app, a picture (gallery) app, or the like) stored in the user terminal 100. For example, the user terminal 100 may execute and operate another app through an intelligent app (or a speech recognition app) stored in the user terminal 100. The user terminal 100 may execute the other app through the intelligent app and may receive a user input for executing an action. For example, the user input may be received through a physical button, a touch pad, a voice input, a remote input, or the like. According to an embodiment, various types of terminal devices (or an electronic device), which are connected with Internet, such as, for example, and without limitation, a mobile phone, a smartphone, personal digital assistant (PDA), a notebook computer, or the like, may correspond to the user terminal 100.

According to an embodiment, the user terminal 100 may receive user utterance as a user input. The user terminal 100 may receive the user utterance and may generate a command for operating an app based on the user utterance. As such, the user terminal 100 may operate the app using the command.

The intelligent server 200 may receive a voice input of a user from the user terminal 100 over a communication network and may convert the voice input to text data. In another embodiment, the intelligent server 200 may generate (or select) a path rule based on the text data. The path rule may include information about an action (or an operation) for performing the function of an app or information about a parameter necessary to perform the action. In addition, the path rule may include the order of the action of the app. The user terminal 100 may receive the path rule, may select an app depending on the path rule, and may execute the action included in the path rule in the selected app.

Generally, the term "path rule" of the present disclosure may refer, for example, to, but is not limited to, the sequence of states, which allows the electronic device to perform the task requested by the user. In other words, the path rule may include information about the sequence of the states. For example, the task may be a certain action that the intelligent app is capable of providing. The task may include the generation of a schedule, the transmission of a picture to a desired opponent, or the provision of weather information. The user terminal 100 may perform the task by sequentially having at least one or more states (e.g., an operating state of the user terminal 100).

According to an embodiment, the path rule may be provided or generated by an artificial intelligent (AI) system. The artificial intelligent system may refer, for example, to a rule-based system, or may refer, for example, to a neural network-based system (e.g., a feedforward neural network (FNN) or a recurrent neural network (RNN)). Alternatively, the artificial intelligent system may be a combination of the above-described systems or an artificial intelligent system different from the above-described system. According to an embodiment, the path rule may be selected from a set of predefined path rules or may be generated in real time in response to a user request. For example, the artificial intelligent system may select at least a path rule of predefined plurality of path rules, or may generate a path rule dynamically (or in real time). Furthermore, the user terminal 100 may use a hybrid system to provide the path rule.

According to an embodiment, the user terminal 100 may execute the action and may display a screen corresponding to a state of the user terminal 100, which executes the action, in a display. According to another embodiment, the user terminal 100 may execute the action and may not display the result obtained by executing the action in the display. For example, the user terminal 100 may execute a plurality of actions and may display only the result of a part of the plurality of actions in the display. For example, the user terminal 100 may display only the result, which is obtained by executing the last action, in the display. For another example, the user terminal 100 may receive the user input to display the result obtained by executing the action in the display.

The personal information server 300 may include a database in which user information is stored. For example, the personal information server 300 may receive the user information (e.g., context information, information about execution of an app, or the like) from the user terminal 100 and may store the user information in the database. The intelligent server 200 may be used to receive the user information from the personal information server 300 over the communication network and to generate a path rule associated with the user input. According to an embodiment, the user terminal 100 may receive the user information from the personal information server 300 over the communication network, and may use the user information as information for managing the database.

The suggestion server 400 may include a database storing, for example, and without limitation, information about a function in a terminal, introduction of an application, and/or a function to be provided, or the like. For example, the suggestion server 400 may include a database associated with a function that a user utilizes by receiving the user information of the user terminal 100 from the personal information server 300. The user terminal 100 may receive information about the function to be provided from the suggestion server 400 over the communication network and may provide the information to the user.

Figure 2:
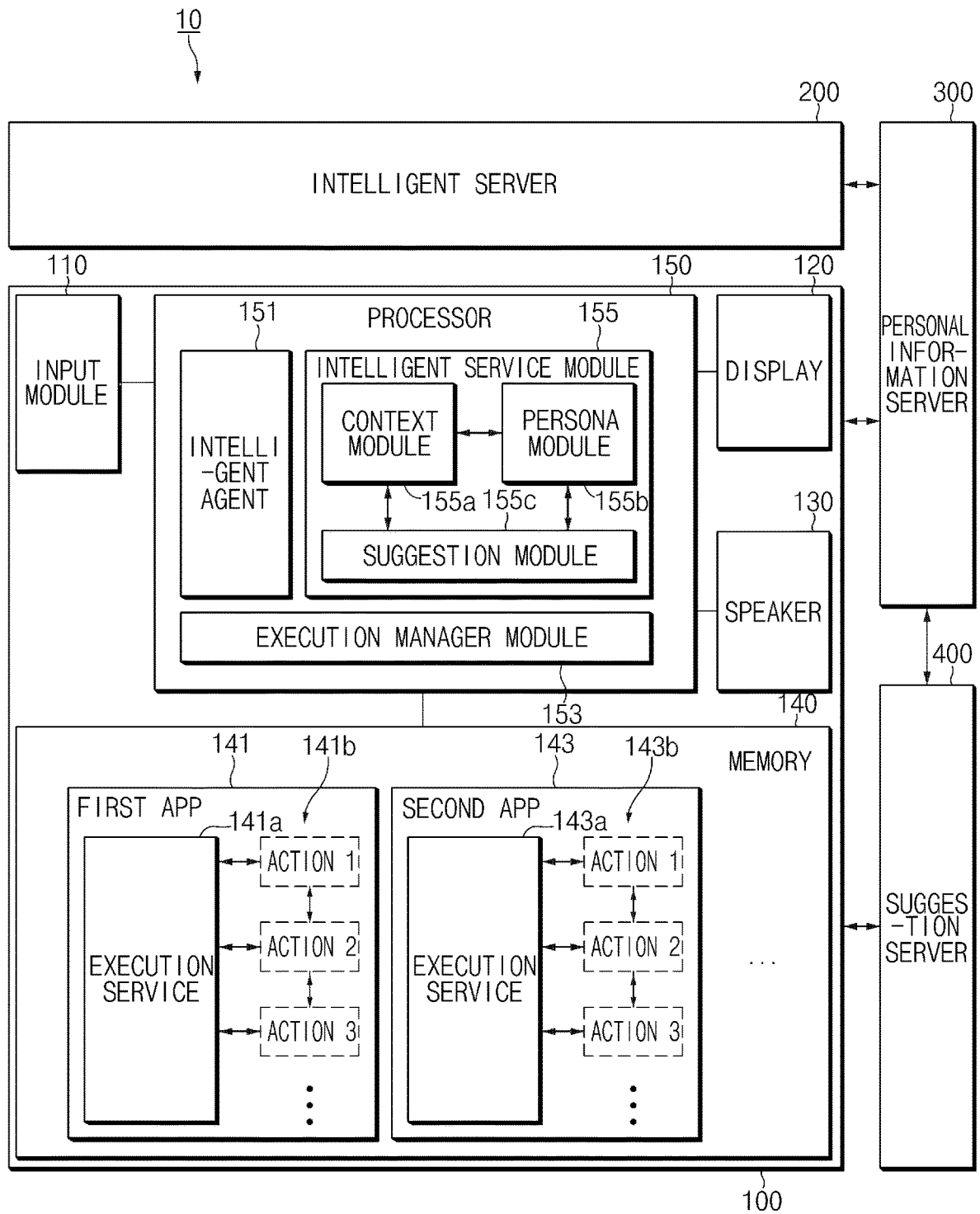
FIG. 2 is a block diagram illustrating a user terminal of an integrated intelligent system, according to an embodiment of the present disclosure.

FIG. 2 is a block diagram illustrating a user terminal of an integrated intelligent system, according to an embodiment of the present disclosure.

Referring to FIG. 2, the user terminal 100 may include an input module (e.g., including input circuitry) 110, a display 120, a speaker 130, a memory 140, and/or a processor (e.g., including processing circuitry) 150. The user terminal 100 may further include a housing, and components of the user terminal 100 may be seated in the housing or may be positioned on the housing.

According to an embodiment, the input module 110 may include various input circuitry and receive a user input from a user. For example, the input module 110 may receive the user input from the connected external device (e.g., a keyboard or a headset). For another example, the input module 110 may include a touchscreen (e.g., a touchscreen display) coupled to the display 120. For another example, the input module 110 may include a hardware key (or a physical key) positioned in the user terminal 100 (or the housing of the user terminal 100).

According to an embodiment, the input module 110 may include a microphone that is capable of receiving the utterance of the user as a voice signal. For example, the input module 110 may include an utterance input system and may receive the utterance of the user as a voice signal through the utterance input system.

According to an embodiment, the display 120 may display an image, a video, and/or an execution screen of an application. For example, the display 120 may display a graphic user interface (GUI) of an app.

According to an embodiment, the speaker 130 may output the voice signal. For example, the speaker 130 may output the voice signal generated in the user terminal 100 to the outside.

According to an embodiment, the memory 140 may store a plurality of apps (or application program) 141 and 143. The plurality of apps 141 and 143 stored in the memory 140 may be selected, launched, and executed depending on the user input.

According to an embodiment, the memory 140 may include a database capable of storing information necessary to recognize the user input. For example, the memory 140 may include a log database capable of storing log information. For another example, the memory 140 may include a persona database capable of storing user information.

According to an embodiment, the memory 140 may store the plurality of apps 141 and 143, and the plurality of apps 141 and 143 may be loaded to operate. For example, the plurality of apps 141 and 143 stored in the memory 140 may be loaded by an execution manager module 153 of the processor 150 to operate. The plurality of apps 141 and 143 may include execution service modules 141a and 143a performing a function. In an embodiment, the plurality of apps 141 and 143 may perform a plurality of actions (e.g., a sequence of states) 141b and 143b through execution service modules 141a and 143a for the purpose of performing a function. That is, the execution service modules 141a and 143a may be activated by the execution manager module 153, and then may execute the plurality of actions 141b and 143b.

According to an embodiment, when the actions 141b and 143b of the apps 141 and 143 are executed, an execution state screen according to the execution of the actions 141b and 143b may be displayed in the display 120. For example, the execution state screen may be a screen in a state where the actions 141b and 143b are completed. For another example, the execution state screen may be a screen in a state where the execution of the actions 141b and 143b is in partial landing (e.g., in the case where a parameter necessary for the actions 141b and 143b are not entered).

According to an embodiment, the execution service modules 141a and 143a may execute the actions 141b and 143b depending on a path rule. For example, the execution service modules 141a and 143a may be activated by the execution manager module 153, may receive an execution request from the execution manager module 153 depending on the path rule, and may execute functions of the apps 141 and 143 by performing the actions 141b and 143b depending on the execution request. When the execution of the actions 141b and 143b is completed, the execution service modules 141a and 143a may transmit completion information to the execution manager module 153.

According to an embodiment, in the case where the plurality of the actions 141b and 143b are respectively executed in the apps 141 and 143, the plurality of the actions 141b and 143b may be sequentially executed. When the execution of one action (e.g., action 1 of the first app 141 or action 1 of the second app 143) is completed, the execution service modules 141a and 143a may open the next action (e.g., action 2 of the first app 141 or action 2 of the second app 143) and may transmit the completion information to the execution manager module 153. Here, it is understood that opening an arbitrary action may include, for example, and without limitation, a state of the arbitrary action to an executable state or to prepare the execution of the action. In other words, when the arbitrary action is not opened, the corresponding action may be not executed. When the completion information is received, the execution manager module 153 may transmit the execution request associated with the next action (e.g., action 2 of the first app 141 or action 2 of the second app 143) to the execution service modules 141a and 143a. According to an embodiment, in the case where the plurality of apps 141 and 143 are executed, the plurality of apps 141 and 143 may be sequentially executed. For example, when receiving the completion information after the execution of the last action (e.g., action 3 of the first app 141) of the first app 141 is completed, the execution manager module 153 may transmit the execution request of the first action (e.g., action 1 of the second app 143) of the second app 143 to the execution service module 143a.

According to an embodiment, in the case where the plurality of the actions 141b and 143b are executed in the apps 141 and 143, a result screen according to the execution of each of the executed plurality of the actions 141b and 143b may be displayed in the display 120. According to an embodiment, only a part of a plurality of result screens according to the executed plurality of the actions 141b and 143b may be displayed in the display 120.

According to an embodiment, the memory 140 may store an intelligent app (e.g., a speech recognition app) operating in conjunction with an intelligent agent 151. The app operating in conjunction with the intelligent agent 151 may receive and process the utterance of the user as a voice signal. According to an embodiment, the app operating in conjunction with the intelligent agent 151 may be operated by a specific input (e.g., an input through a hardware key, an input through a touchscreen, or a specific voice input) input through the input module 110.

According to an embodiment, the processor 150 may control overall actions of the user terminal 100. For example, the processor 150 may control the input module 110 to receive the user input. The processor 150 may control the display 120 to display an image. The processor 150 may control the speaker 130 to output the voice signal. The processor 150 may control the memory 140 to read or store necessary information.

According to an embodiment, the processor 150 may include the intelligent agent 151, the execution manager module 153, or an intelligent service module 155. In an embodiment, the processor 150 may drive the intelligent agent 151, the execution manager module 153, or the intelligent service module 155 by executing instructions stored in the memory 140. Modules described in various embodiments of the present disclosure may be implemented by hardware or by software. In various embodiments of the present disclosure, it is understood that the action executed by the intelligent agent 151, the execution manager module 153, or the intelligent service module 155 is an action executed by the processor 150.

According to an embodiment, the intelligent agent 151 may generate a command for operating an app based on the voice signal received as the user input. According to an embodiment, the execution manager module 153 may receive the generated command from the intelligent agent 151, and may select, launch, and operate the apps 141 and 143 stored in the memory 140. According to an embodiment, the intelligent service module 155 may manage information of the user and may use the information of the user to process the user input.

The intelligent agent 151 may transmit and process the user input received through the input module 110 to the intelligent server 200.

According to an embodiment, before transmitting the user input to the intelligent server 200, the intelligent agent 151 may pre-process the user input. According to an embodiment, to pre-process the user input, the intelligent agent 151 may include an adaptive echo canceller (AEC) module, a noise suppression (NS) module, an end-point detection (EPD) module, or an automatic gain control (AGC) module. The AEC may remove an echo included in the user input. The NS module may suppress a background noise included in the user input. The EPD module may detect an end-point of a user voice included in the user input to search for a part in which the user voice is present. The AGC module may recognize the user input and may adjust the volume of the user input so as to be suitable to process the recognized user input. According to an embodiment, the intelligent agent 151 may include all the pre-processing components for performance. However, in another embodiment, the intelligent agent 151 may include a part of the pre-processing components to operate at low power.

According to an embodiment, the intelligent agent 151 may include a wakeup recognition module recognizing a call of a user. The wakeup recognition module may recognize a wake up command of the user through the speech recognition module. In the case where the wakeup recognition module receives the wake up command, the wakeup recognition module may activate the intelligent agent 151 to receive the user input. According to an embodiment, the wakeup recognition module of the intelligent agent 151 may be implemented with a low-power processor (e.g., a processor included in an audio codec). According to an embodiment, the intelligent agent 151 may be activated depending on the user input entered through a hardware key. In the case where the intelligent agent 151 is activated, an intelligent app (e.g., a speech recognition app) operating in conjunction with the intelligent agent 151 may be executed.

According to an embodiment, the intelligent agent 151 may include a speech recognition module for performing the user input. The speech recognition module may recognize the user input for executing an action in an app. For example, the speech recognition module may recognize a limited user (voice) input (e.g., utterance such as "click" for executing a capturing action when a camera app is being executed) for executing an action such as the wake up command in the apps 141 and 143. For example, the speech recognition module for recognizing a user input while assisting the intelligent server 200 may recognize and rapidly process a user command that can be processed in the user terminal 100. According to an embodiment, the speech recognition module for executing the user input of the intelligent agent 151 may be implemented in an app processor.

According to an embodiment, the speech recognition module (including the speech recognition module of a wake up module) of the intelligent agent 151 may recognize the user input using an algorithm for recognizing a voice. For example, the algorithm for recognizing the voice may be at least one of a hidden Markov model (HMM) algorithm, an artificial neural network (ANN) algorithm, or a dynamic time warping (DTW) algorithm.

According to an embodiment, the intelligent agent 151 may change the voice input of the user to text data. According to an embodiment, the intelligent agent 151 may transmit the voice of the user to the intelligent server 200 to receive the changed text data. As such, the intelligent agent 151 may display the text data in the display 120.

According to an embodiment, the intelligent agent 151 may receive a path rule from the intelligent server 200. According to an embodiment, the intelligent agent 151 may transmit the path rule to the execution manager module 153.

According to an embodiment, the intelligent agent 151 may transmit the execution result log according to the path rule received from the intelligent server 200 to the intelligent service module 155, and the transmitted execution result log may be accumulated and managed in preference information of the user of a persona module 155b.

According to an embodiment, the execution manager module 153 may receive the path rule from the intelligent agent 151 to execute the apps 141 and 143 and may allow the apps 141 and 143 to execute the actions 141b and 143b included in the path rule. For example, the execution manager module 153 may transmit command information (e.g., information about a path rule) for executing the actions 141b and 143b to the apps 141 and 143 and may receive completion information of the actions 141b and 143b from the apps 141 and 143.

According to an embodiment, the execution manager module 153 may transmit and/or receive the command information (e.g., information about a path rule) for executing the actions 141b and 143b of the apps 141 and 143 between the intelligent agent 151 and the apps 141 and 143. The execution manager module 153 may bind the apps 141 and 143 to be executed depending on the path rule and may transmit the command information (e.g., information about a path rule) of the actions 141b and 143b included in the path rule to the apps 141 and 143. For example, the execution manager module 153 may sequentially transmit the actions 141b and 143b included in the path rule to the apps 141 and 143 and may sequentially execute the actions 141b and 143b of the apps 141 and 143 depending on the path rule.

According to an embodiment, the execution manager module 153 may manage execution states of the actions 141b and 143b of the apps 141 and 143. For example, the execution manager module 153 may receive information about the execution states of the actions 141b and 143b from the apps 141 and 143. For example, in the case where the execution states of the actions 141b and 143b are in partial landing (e.g., in the case where a parameter necessary for the actions 141b and 143b are not input), the execution manager module 153 may transmit information about the partial landing to the intelligent agent 151. The intelligent agent 151 may make a request for an input of necessary information (e.g., parameter information) to the user using the received information. For another example, in the case where the execution states of the actions 141b and 143b are in an operating state, the utterance may be received from the user, and the execution manager module 153 may transmit information about the apps 141 and 143 being executed and the execution states of the apps 141 and 143 to the intelligent agent 151. The intelligent agent 151 may receive parameter information of the utterance of the user through the intelligent server 200 and may transmit the received parameter information to the execution manager module 153. The execution manager module 153 may change a parameter of each of the actions 141b and 143b to a new parameter using the received parameter information.

According to an embodiment, the execution manager module 153 may transmit the parameter information included in the path rule to the apps 141 and 143. In the case where the plurality of apps 141 and 143 are sequentially executed depending on the path rule, the execution manager module 153 may transmit the parameter information included in the path rule from one app to another app.

According to an embodiment, the execution manager module 153 may receive a plurality of path rules. The execution manager module 153 may select a plurality of path rules based on the utterance of the user. For example, in the case where the user utterance specifies one app 141 executing one action 141b but does not specify the other app 143 executing the other action 143b, the execution manager module 153 may receive a plurality of different path rules, in which the same app 141 (e.g., gallery app) executing the one action 141b is executed and in which a different app 143 (e.g., message app or Telegram app) executing the other action 143b is executed. For example, the execution manager module 153 may execute the same actions 141b and 143b (e.g., the same successive actions 141b and 143b) of the plurality of path rules. In the case where the execution manager module 153 executes the same action, the execution manager module 153 may display a state screen for selecting the different apps 141 and 143 included in the plurality of path rules in the display 120.

According to an embodiment, the intelligent service module 155 may include, for example, and without limitation, a context module 155*a*, a persona module 155*b*, and/or a suggestion module 155*c*, or the like.

The context module 155*a* may collect current states of the apps 141 and 143 from the apps 141 and 143. For example, the context module 155*a* may receive context information indicating the current states of the apps 141 and 143 to collect the current states of the apps 141 and 143.

The persona module 155*b* may manage personal information of the user utilizing the user terminal 100. For example, the persona module 155*b* may collect the usage information and the execution result of the user terminal 100 to manage personal information of the user.

The suggestion module 155*c* may predict the intent of the user to recommend a command to the user. For example, the suggestion module 155*c* may recommend a command to the user in consideration of the current state (e.g., a time, a place, a situation, or an app) of the user.

Figure 3:
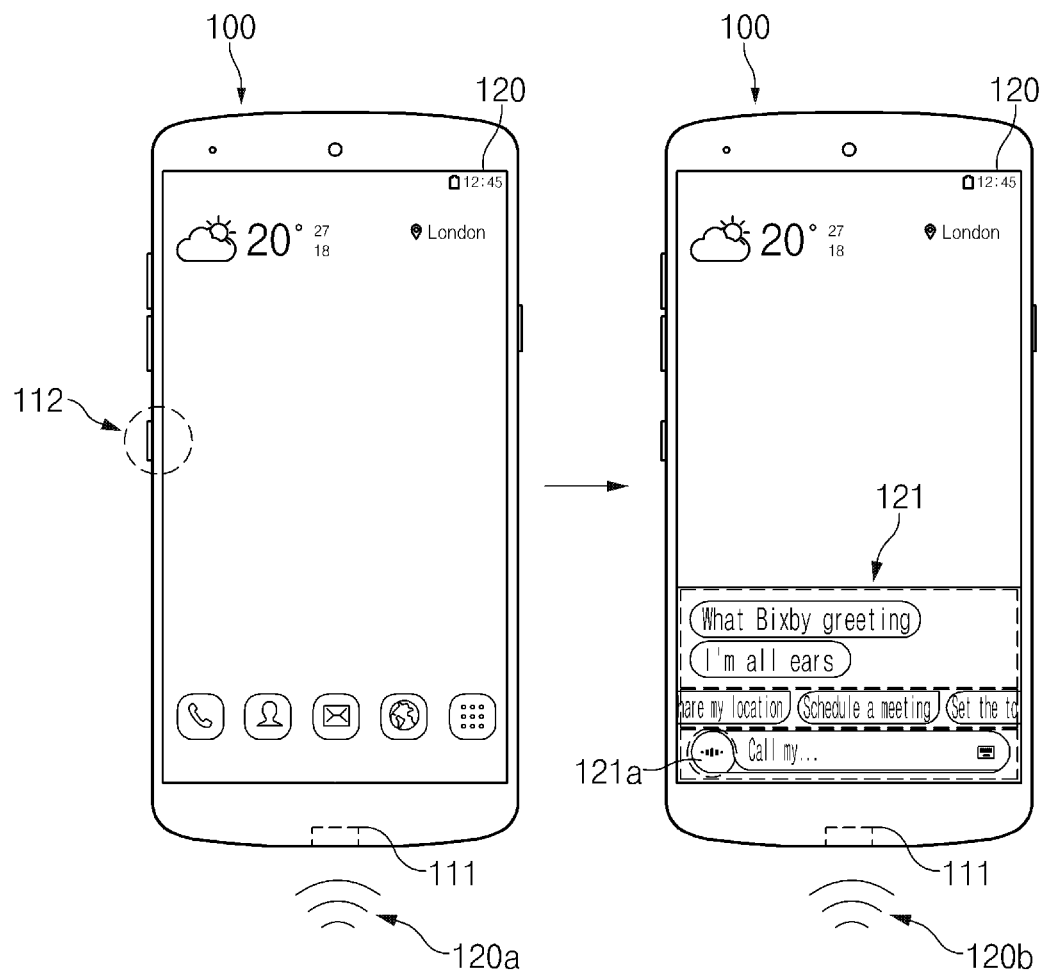
FIG. 3 is a diagram illustrating execution of an intelligent app of a user terminal, according to an embodiment of the present disclosure.

FIG. 3 is a diagram illustrating execution of an intelligent app of a user terminal, according to an embodiment of the present disclosure.

FIG. 3 illustrates that the user terminal 100 receives a user input to execute an intelligent app (e.g., a speech recognition app) operating in conjunction with the intelligent agent 151.

According to an embodiment, the user terminal 100 may execute the intelligent app for recognizing a voice through a hardware key 112. For example, in the case where the user terminal 100 receives the user input through the hardware key 112, the user terminal 100 may display a UI 121 of the intelligent app in the display 120. For example, a user may touch a speech recognition button 121*a* to the UI 121 of the intelligent app for the purpose of entering a voice 120*b* in a state where the UI 121 of the intelligent app is displayed in the display 120. For another example, while continuously pressing the hardware key 112 to enter the voice 120*b*, the user may enter the voice 120*b*.

According to an embodiment, the user terminal 100 may execute the intelligent app for recognizing a voice through a microphone 111. For example, in the case where a specified voice (e.g., wake up!) is entered 120*a* through the microphone 111, the user terminal 100 may display the UI 121 of the intelligent app in the display 120.

Figure 4:
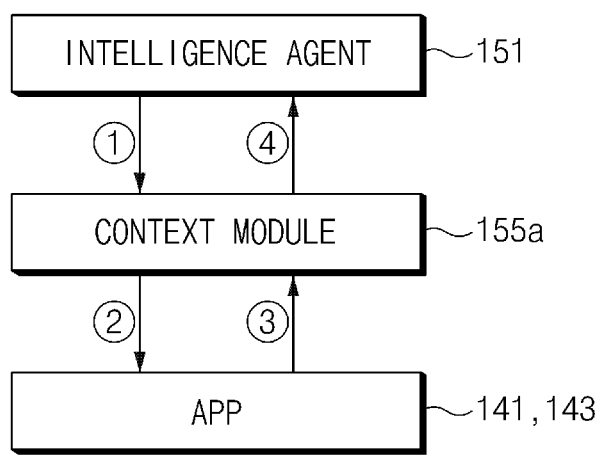
FIG. 4 is a diagram illustrating a context module of an intelligent service module collecting a current state, according to an embodiment of the present disclosure.

FIG. 4 is a diagram illustrating a context module of an intelligent service module collecting a current state, according to an embodiment of the present disclosure.

Referring to FIG. 4, if receiving a context request from the intelligent agent 151 ①, the context module 155*a* may make a request for context information indicating current states of the apps 141 and 143 to the apps 141 and 143 ②. According to an embodiment, the context module 155*a* may receive the context information from the apps 141 and 143 ③ and may transmit the context information to the intelligent agent 151 ④.

According to an embodiment, the context module 155*a* may receive pieces of context information through the apps 141 and 143. For example, the context information may be information about the most recently executed apps 141 and 143. For another example, the context information may be information (e.g., information about the corresponding picture in the case where a user watches a picture through a gallery app) about the current states in the apps 141 and 143.

According to an embodiment, the context module 155*a* may receive context information indicating a current state of the user terminal 100 from a device platform as well as the apps 141 and 143. The context information may include general context information, user context information, or device context information.

The general context information may include, for example, general information of the user terminal 100. The general context information may be verified through an internal algorithm by receiving data through a sensor hub of the device platform or the like. For example, the general context information may include information about current time and space. For example, the information about the current time and space may include information about current time or a current location of the user terminal 100. The current time may be verified through the time on the user terminal 100, and the information about the current location may be verified through a global positioning system (GPS). For another example, the general context information may include information about physical motion. For example, the information about the physical motion may include information about walking, running, driving, or the like. The information about the physical motion may be verified through a motion sensor. The information about the driving may be verified by sensing Bluetooth connection in a vehicle such that boarding and parking is verified as well as verifying the driving through the motion sensor. For another example, the general context information may include user activity information. For example, the user activity information may include information about commuting, shopping, travel, or the like. The user activity information may be verified using information about a place where a user or an app enters in a database.

The user context information may include information about the user. For example, the user context information may include information about an emotional state of the user. For example, the information about the emotional state of the user may include information about happiness, sadness, anger, or the like of the user. For another example, the user context information may include information about the current state of the user. For example, the information about the current state of the user may include information about interest, intent, or the like (e.g., shopping).

The device context information may include information about the state of the user terminal 100. For example, the device context information may include information about a path rule that the execution manager module 153 performs. For another example, the device information may include information about a battery. For example, the information about the battery may be verified through charging and discharging states of the battery. For another example, the device information may include information about a connected device and a connected network. For example, the information about the connected device may be verified through a communication interface connected with the device.

Figure 5:
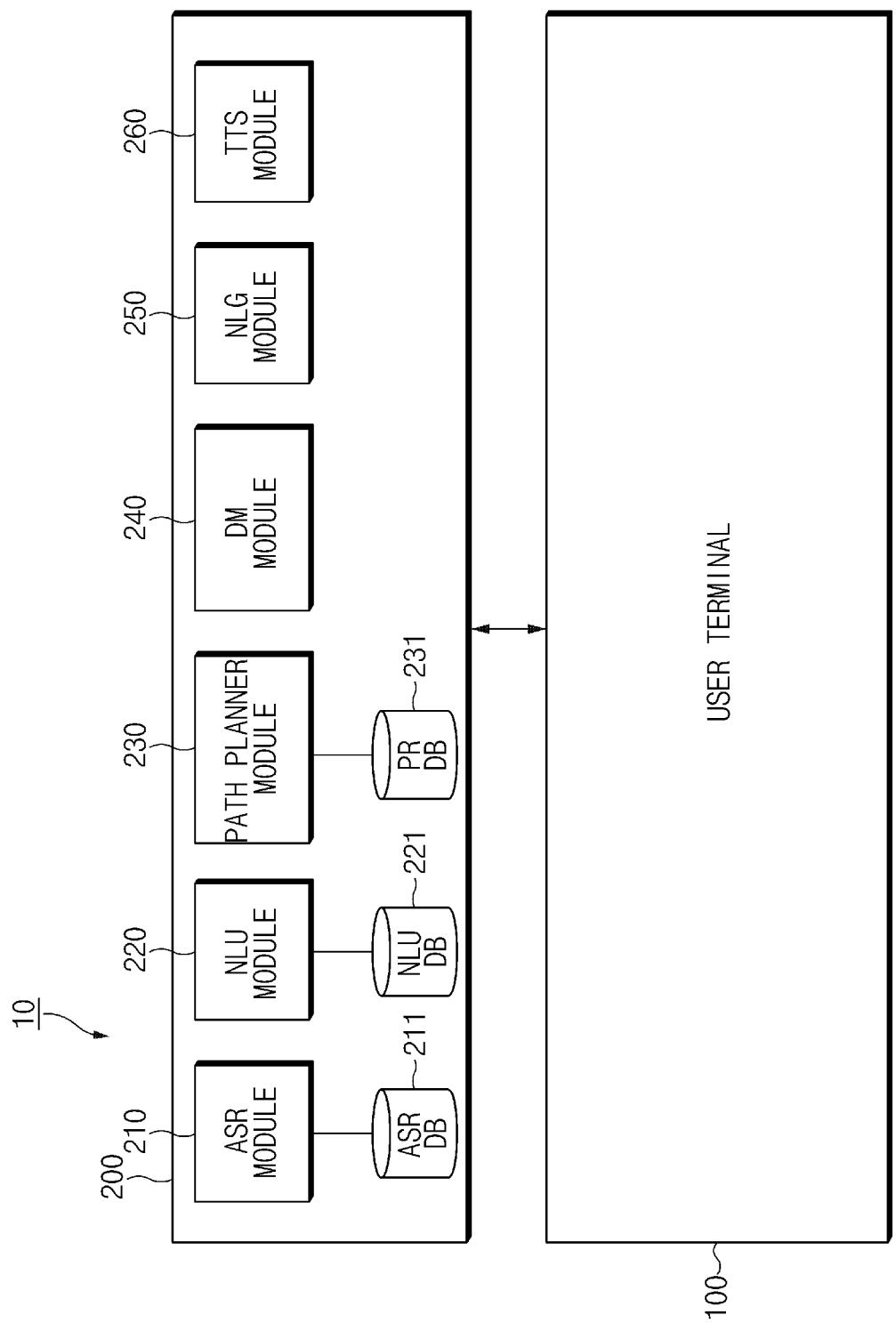
FIG. 5 is a block diagram illustrating an intelligent server of an integrated intelligent system, according to an embodiment of the present disclosure.

FIG. 5 is a block diagram illustrating an intelligent server of an integrated intelligent system, according to an embodiment of the present disclosure.

Referring to FIG. 5, the intelligent server 200 may include an automatic speech recognition (ASR) module (e.g., including processing circuitry and/or program elements) 210, a natural language understanding (NLU) module (e.g., including processing circuitry and/or program elements) 220, a path planner module (e.g., including processing circuitry and/or program elements) 230, a dialogue manager (DM) module (e.g., including processing circuitry and/or program elements) 240, a natural language generator (NLG) module (e.g., including processing circuitry and/or program elements) 250, and/or a text to speech (TTS) module (e.g., including processing circuitry and/or program elements) 260.

The NLU module 220 or the path planner module 230 of the intelligent server 200 may generate a path rule.

According to an embodiment, the ASR module 210 may change the user input received from the user terminal 100 to text data.

According to an embodiment, the ASR module 210 may convert the user input received from the user terminal 100 to text data. For example, the ASR module 210 may include a speech recognition module. The speech recognition module may include an acoustic model and a language model. For example, the acoustic model may include information associated with phonation, and the language model may include unit phoneme information and information about a combination of unit phoneme information. The speech recognition module may convert user speech to text data using the information associated with phonation and unit phoneme information. For example, the information about the acoustic model and the language model may be stored in an automatic speech recognition database (ASR DB) 211.

According to an embodiment, the NLU module 220 may grasp user intent by performing syntactic analysis or semantic analysis. The syntactic analysis may divide the user input into syntactic units (e.g., words, phrases, morphemes, and the like) and determine which syntactic elements the divided units have. The semantic analysis may be performed using semantic matching, rule matching, formula matching, or the like. As such, the NLU module 220 may obtain a domain, intent, or a parameter (or a slot) necessary to express the intent, from the user input.

According to an embodiment, the NLU module 220 may determine the intent of the user and parameter using a matching rule that is divided into a domain, intent, and a parameter (or a slot) necessary to grasp the intent. For example, the one domain (e.g., an alarm) may include a plurality of intent (e.g., alarm settings, alarm cancellation, and the like), and one intent may include a plurality of parameters (e.g., a time, the number of iterations, an alarm sound, and the like). For example, the plurality of rules may include one or more necessary parameters. The matching rule may be stored in a natural language understanding database (NLU DB) 221.

According to an embodiment, the NLU module 220 may grasp the meaning of words extracted from a user input using linguistic features (e.g., grammatical elements) such as morphemes, phrases, and the like and may match the meaning of the grasped words to the domain and intent to determine user intent. For example, the NLU module 220 may calculate how many words extracted from the user input is included in each of the domain and the intent, for the purpose of determining the user intent. According to an embodiment, the NLU module 220 may determine a parameter of the user input using the words, which are based for grasping the intent. According to an embodiment, the NLU module 220 may determine the user intent using the NLU DB 221 storing the linguistic features for grasping the intent of the user input. According to another embodiment, the NLU module 220 may determine the user intent using a personal language model (PLM). For example, the NLU module 220 may determine the user intent using the personalized information (e.g., a contact list or a music list). For example, the PLM may be stored in the NLU DB 221. According to an embodiment, the ASR module 210 as well as the NLU module 220 may recognize the voice of the user with reference to the PLM stored in the NLU DB 221.

According to an embodiment, the NLU module 220 may generate a path rule based on the intent of the user input and the parameter. For example, the NLU module 220 may select an app to be executed, based on the intent of the user input and may determine an action to be executed, in the selected app. The NLU module 220 may determine the parameter corresponding to the determined action to generate the path rule. According to an embodiment, the path rule generated by the NLU module 220 may include information about the app to be executed, the action (e.g., at least one or more states) to be executed in the app, and a parameter necessary to execute the action.

According to an embodiment, the NLU module 220 may generate one path rule, or a plurality of path rules based on the intent of the user input and the parameter. For example, the NLU module 220 may receive a path rule set corresponding to the user terminal 100 from the path planner module 230 and may map the intent of the user input and the parameter to the received path rule set to determine the path rule.

According to another embodiment, the NLU module 220 may determine the app to be executed, the action to be executed in the app, and a parameter necessary to execute the action based on the intent of the user input and the parameter for the purpose of generating one path rule or a plurality of path rules. For example, the NLU module 220 may arrange the app to be executed and the action to be executed in the app in the form of ontology or a graph model using information of the user terminal 100 depending on the intent of the user input for the purpose of generating the path rule. For example, the generated path rule may be stored in a path rule database (PR DB) 231 through the path planner module 230. The generated path rule may be added to a path rule set of the PR DB 231.

According to an embodiment, the NLU module 220 may select at least one path rule of the generated plurality of path rules. For example, the NLU module 220 may select an optimal path rule of the plurality of path rules. For another example, in the case where only a part of action is specified based on the user utterance, the NLU module 220 may select a plurality of path rules. The NLU module 220 may determine one path rule of the plurality of path rules depending on an additional input of the user.

According to an embodiment, the NLU module 220 may transmit the path rule to the user terminal 100 in response to a request for the user input. For example, the NLU module 220 may transmit one path rule corresponding to the user input to the user terminal 100. For another example, the NLU module 220 may transmit the plurality of path rules corresponding to the user input to the user terminal 100. For example, in the case where only a part of action is specified based on the user utterance, the plurality of path rules may be generated by the NLU module 220.

According to an embodiment, the path planner module 230 may select at least one path rule of the plurality of path rules.

According to an embodiment, the path planner module 230 may transmit a path rule set including the plurality of path rules to the NLU module 220. The plurality of path rules of the path rule set may be stored in the PR DB 231 connected to the path planner module 230 in the table form. For example, the path planner module 230 may transmit a path rule set corresponding to information (e.g., OS information or app information) of the user terminal 100, which is received from the intelligent agent 151, to the NLU module 220. For example, a table stored in the PR DB 231 may be stored for each domain or for each version of the domain.

According to an embodiment, the path planner module 230 may select one path rule or the plurality of path rules from the path rule set to transmit the selected one path rule or the selected plurality of path rules to the NLU module 220. For example, the path planner module 230 may match the user intent and the parameter to the path rule set corresponding to the user terminal 100 to select one path rule or a plurality of path rules and may transmit the selected one path rule or the selected plurality of path rules to the NLU module 220.

According to an embodiment, the path planner module 230 may generate the one path rule or the plurality of path rules using the user intent and the parameter. For example, the path planner module 230 may determine the app to be executed and the action to be executed in the app based on the user intent and the parameter for the purpose of generating the one path rule or the plurality of path rules. According to an embodiment, the path planner module 230 may store the generated path rule in the PR DB 231.

According to an embodiment, the path planner module 230 may store the path rule generated by the NLU module 220 in the PR DB 231. The generated path rule may be added to the path rule set stored in the PR DB 231.

According to an embodiment, the table stored in the PR DB 231 may include a plurality of path rules or a plurality of path rule sets. The plurality of path rules or the plurality of path rule sets may reflect the kind, version, type, or characteristic of a device performing each path rule.

According to an embodiment, the DM module 240 may determine whether the user intent grasped by the NLU module 220 is definite. For example, the DM module 240 may determine whether the user intent is clear, based on whether the information of a parameter is sufficient. The DM module 240 may determine whether the parameter grasped by the NLU module 220 is sufficient to perform a task. According to an embodiment, in the case where the user intent is not clear, the DM module 240 may perform a feedback for making a request for necessary information to the user. For example, the DM module 240 may perform a feedback for making a request for information about the parameter for grasping the user intent.

According to an embodiment, the DM module 240 may include a content provider module. In the case where the content provider module executes an action based on the intent and the parameter grasped by the NLU module 220, the content provider module may generate the result obtained by performing a task corresponding to the user input. According to an embodiment, the DM module 240 may transmit the result generated by the content provider module as the response to the user input to the user terminal 100.

According to an embodiment, the NLG module 250 may change specified information to a text form. Information changed to the text form may be a form of a natural language utterance. For example, the specified information may be information about an additional input, information for guiding the completion of an action corresponding to the user input, or information for guiding the additional input of the user (e.g., feedback information about the user input). The information changed to the text form may be displayed in the display 120 after being transmitted to the user terminal 100 or may be changed to a voice form after being transmitted to the TTS module 260.

According to an embodiment, the TTS module 260 may change information of the text form to information of a voice form. The TTS module 260 may receive the information of the text form from the NLG module 250, may change the information of the text form to the information of a voice form, and may transmit the information of the voice form to the user terminal 100. The user terminal 100 may output the information of the voice form to the speaker 130

According to an embodiment, the NLU module 220, the path planner module 230, and the DM module 240 may be implemented with one module. For example, the NLU module 220, the path planner module 230 and the DM module 240 may be implemented with one module, may determine the user intent and the parameter, and may generate a response (e.g., a path rule) corresponding to the determined user intent and parameter. As such, the generated response may be transmitted to the user terminal 100.

Figure 6:
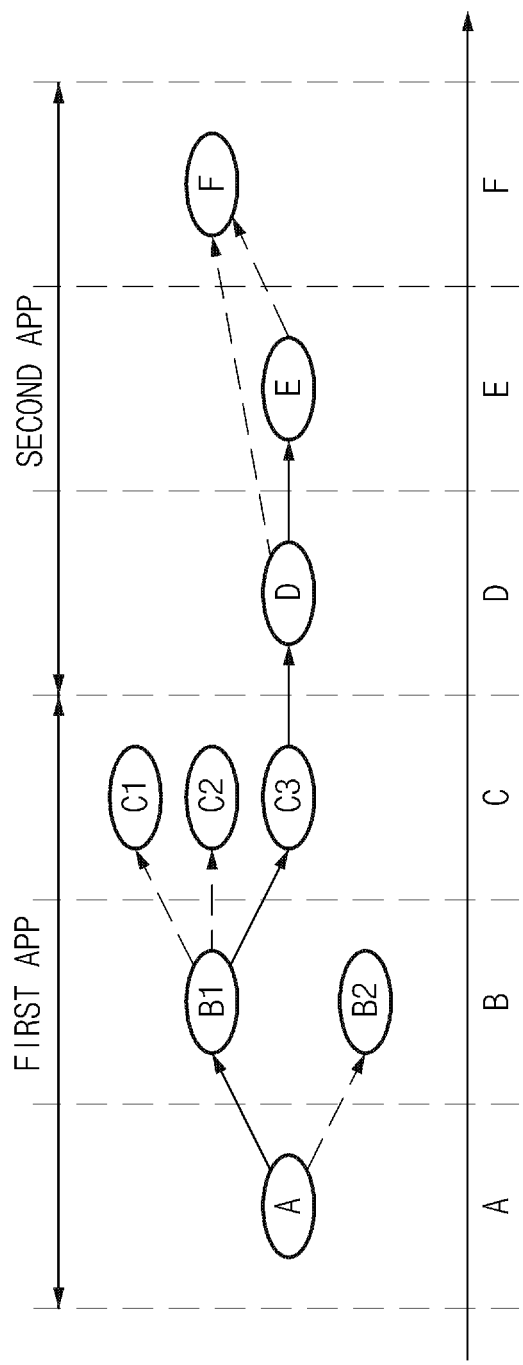
FIG. 6 is a diagram illustrating a path rule generating method of a natural language understanding (NLU) module, according to an embodiment of the present disclosure.

FIG. 6 is a diagram illustrating a path rule generating method of a path planner module, according to an embodiment of the present disclosure.

Referring to FIG. 6, according to an embodiment, the NLU module 220 may divide the function of an app into any one action (e.g., state A to state F) and may store the divided unit actions in the PR DB 231. For example, the NLU module 220 may store a path rule set including a plurality of path rules A-B1-C1, A-B1-C2, A-B1-C3-D-F, A-B2 and A-B1-C3-D-E-F, which are divided into actions (e.g., states), in the PR DB 231.

According to an embodiment, the PR DB 231 of the path planner module 230 may store the path rule set for performing the function of an app. The path rule set may include a plurality of path rules each of which includes a plurality of actions (e.g., a sequence of states). An action executed depending on a parameter input to each of the plurality of actions may be sequentially arranged in each of the plurality of path rules. According to an embodiment, the plurality of path rules implemented in a form of ontology or a graph model may be stored in the PR DB 231.

According to an embodiment, the NLU module 220 may select an optimal path rule A-B1-C3-D-F of the plurality of path rules A-B1-C1, A-B1-C2, A-B1-C3-D-F, A-B2 and A-B1-C3-D-E-F corresponding to the intent of a user input and the parameter.

According to an embodiment, in the case where there is no path rule completely matched to the user input, the NLU module 220 may transmit a plurality of rules to the user terminal 100. For example, the NLU module 220 may select a path rule (e.g., A-B1) partly corresponding to the user input. The NLU module 220 may select one or more path rules (e.g., A-B1-C1, A-B1-C2, A-B1-C3-D-F, and A-B1-C3-D-E-F) including the path rule (e.g., A-B1) partly corresponding to the user input and may transmit the one or more path rules to the user terminal 100.

According to an embodiment, the NLU module 220 may select one of a plurality of path rules based on an input added by the user terminal 100 and may transmit the selected one path rule to the user terminal 100. For example, the NLU module 220 may select one path rule (e.g., A-B1-C3-D-F) of the plurality of path rules (e.g., A-B1-C1, A-B1-C2, A-B1-C3-D-F, and A-B1-C3-D-E-F) depending on the user input (e.g., an input for selecting C3) additionally entered by the user terminal 100 for the purpose of transmitting the selected one path rule to the user terminal 100.

According to another embodiment, the NLU module 220 may determine the intent of a user and the parameter corresponding to the user input (e.g., an input for selecting C3) additionally entered by the user terminal 100 for the purpose of transmitting the user intent or the parameter to the user terminal 100. The user terminal 100 may select one path rule (e.g., A-B1-C3-D-F) of the plurality of path rules (e.g., A-B1-C1, A-B1-C2, A-B1-C3-D-F, and A-B1-C3-D-E-F) based on the transmitted intent or the transmitted parameter.

As such, the user terminal 100 may complete the actions of the apps 141 and 143 based on the selected one path rule.

According to an embodiment, in the case where a user input in which information is insufficient is received by the intelligent server 200, the NLU module 220 may generate a path rule partly corresponding to the received user input. For example, the NLU module 220 may transmit the partly corresponding path rule to the intelligent agent 151. The intelligent agent 151 may transmit the partly corresponding path rule to the execution manager module 153, and the execution manager module 153 may execute the first app 141 depending on the path rule. The execution manager module 153 may transmit information about an insufficient parameter to the intelligent agent 151 while executing the first app 141. The intelligent agent 151 may make a request for an additional input to a user using the information about the insufficient parameter. If the additional input is received by the user, the intelligent agent 151 may transmit and process the additional input to the intelligent server 200. The NLU module 220 may generate a path rule to be added, based on the intent of the user input additionally entered and parameter information additionally entered and may transmit the path rule to be added, to the intelligent agent 151. The intelligent agent 151 may transmit the path rule to the execution manager module 153 and may execute the second app 143.

According to an embodiment, in the case where a user input, in which a portion of information is missed, is received by the intelligent server 200, the NLU module 220 may transmit a user information request to the personal information server 300. The personal information server 300 may transmit information of a user entering the user input stored in a persona database to the NLU module 220. The NLU module 220 may select a path rule corresponding to the user input in which a part of an action is partly missed, using the user information. As such, even though the user input in which a portion of information is missed is received by the intelligent server 200, the NLU module 220 may make a request for the missed information to receive an additional input or may determine a path rule corresponding to the user input using user information.

According to an embodiment, Table 1 attached below may indicate an example form of a path rule associated with a task that a user requests.

TABLE 1

| Path rule ID | State | Parameter |
|---|---|---|
| Gallery_101 | PictureView(25) | NULL |
| | SearchView(26) | NULL |
| | SearchViewResult(27) | Location, time |
| | SearchEmptySelectedView(28) | NULL |
| | SearchSelectedView(29) | ContentType, selectall |
| | CrossShare(30) | Anaphora |

Referring to Table 1, a path rule that is generated or selected by an intelligent server (the intelligent server 200 of FIG. 1) depending on user speech (e.g., "please share a picture") may include at least one state 25, 26, 27, 28, 29 or 30. For example, the at least one state (e.g., one operating state of a terminal) may correspond to at least one of the picture application execution PicturesView 25, the picture search function execution SearchView 26, the search result display screen output SearchViewResult 27, the search result display screen output, in which a picture is non-selected, SearchEmptySelectedView 28, the search result display screen output, in which at least one picture is selected, SearchSelectedView 29, or the share application selection screen output CrossShare 30.

In an embodiment, parameter information of the path rule may correspond to at least one state. For example, the search result display screen output, in which at least one picture is selected, SearchSelectedView 29 may be included in the at least one state.

The task (e.g., "please share a picture!") that the user requests may be performed depending on the execution result of the path rule including the sequence of the states 25, 26, 27, 28, and 29.

Figure 7:
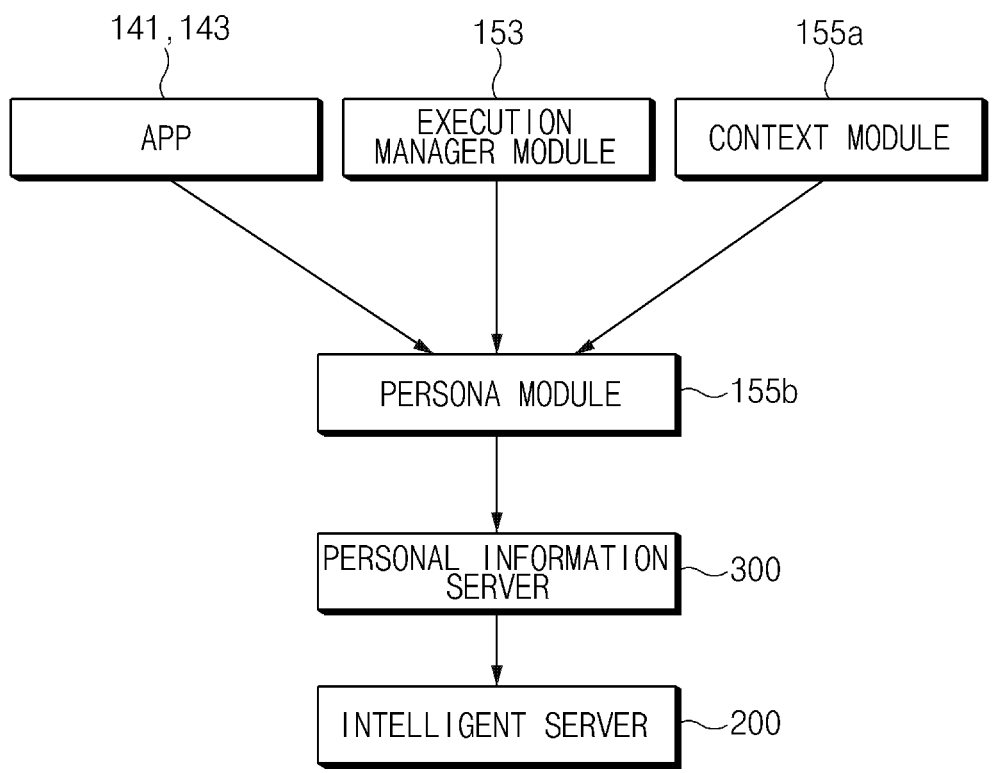
FIG. 7 is a diagram illustrating a persona module of an intelligent service module managing information of a user, according to an embodiment of the present disclosure.

FIG. 7 is a diagram illustrating a persona module of an intelligent service module managing information of a user, according to an embodiment of the present disclosure.

Referring to FIG. 7, the persona module 155b may receive information of the user terminal 100 from the apps 141 and 143, the execution manager module 153, and/or the context module 155a. The apps 141 and 143 and the execution manager module 153 may store information about the result obtained by executing the actions 141b and 143b of an app in an action log database. The context module 155a may store information about a current state of the user terminal 100 in a context database. The persona module 155b may receive the stored information from the action log database or the context database. For example, data stored in the action log database and the context database may be analyzed by an analysis engine and may be transmitted to the persona module 155b.

According to an embodiment, the persona module 155b may transmit information received from the apps 141 and 143, the execution manager module 153, and/or the context module 155a to the suggestion module 155c. For example, the persona module 155b may transmit the data stored in the action log database or the context database to the suggestion module 155c.

According to an embodiment, the persona module 155b may transmit the information received from the apps 141 and 143, the execution manager module 153, or the context module 155a to the personal information server 300. For example, the persona module 155b may periodically transmit the data, which is accumulated and stored in the action log database or the context database, to the personal information server 300.

According to an embodiment, the persona module 155b may transmit the data stored in the action log database or the context database to the suggestion module 155c. User information generated by the persona module 155b may be stored in a persona database. The persona module 155b may periodically transmit the user information stored in the persona database to the personal information server 300. According to an embodiment, the information transmitted to the personal information server 300 by the persona module 155b may be stored in the persona database. The personal information server 300 may infer user information necessary to generate a path rule of the intelligent server 200 using the information stored in the persona database.

According to an embodiment, the user information that the persona module 155b estimates using the transmitted information may include profile information or preference information. The profile information or the preference information may be inferred through an account of the user and accumulated information.

The profile information may include personal information of the user. For example, the profile information may include demographic information of the user. For example, the demographic information may include gender, age, or the like of the user. For another example, the profile information may include life event information. For example, the life event information may be estimated by comparing log information with a life event model and may be strengthened by analyzing a behavior pattern. For another example, the profile information may include interest information. For example, the interest information may include shopping items of interest, interesting fields (e.g., sports, politics, and the like). For another example, the profile information may include activity area information. For example, the activity area information may include information about a house, a work place, or the like. The information about the activity area may include information about an area where a priority is recorded based on accumulated stay time and the number of visits as well as information about a location of a place. For another example, the profile information may include activity time information. For example, the activity time information may include information about a wakeup time, a commute time, a sleep time, or the like. The information about the commute time may be inferred using the activity area information (e.g., information about a house and a workplace). The information about the sleep time may be inferred through an unused time of the user terminal 100.

The preference information may include preference information of the user. For example, the preference information may include information about app preference. For example, the app preference may be inferred through a usage log (e.g., a time- and place-specific usage log) of an app. The app preference may be used to determine an app to be executed depending on a current state (e.g., time or place) of the user. For another example, the preference information may include information about contact preference. For example, the contact preference may be inferred by analyzing information about a contact frequency (e.g., a time- and place-specific frequency of contacting) of a contact. The contact preference may be used to determine a contact to be contacted depending on a current state (e.g., a contact for duplicate names) of the user. For another example, the preference information may include setting information. For example, the setting information may be inferred by analyzing information about setting frequency (e.g., a time- and place-specific frequency of setting a setting value) of a specific setting value. The setting information may be used to set a specific setting value depending on the current state (e.g., a time, a place, or a situation) of the user. For another example, the preference information may include place preference. For example, the place preference may be inferred through visit history (e.g., a time-specific visit history) of a specific place. The place preference may be used to determine a place to visit depending on the current state (e.g., time) of the user. For another example, the preference information may include instruction preference. For example, the instruction preference may be inferred through a usage frequency (e.g., a time- and place-specific usage frequency) of an instruction. The instruction preference may be used to determine an instruction pattern to be used depending on the current state (e.g., time or place) of the user. In particular, the instruction preference may include information about a menu most frequently selected by the user in the current state of an app being executed by analyzing the log information.

Figure 8:
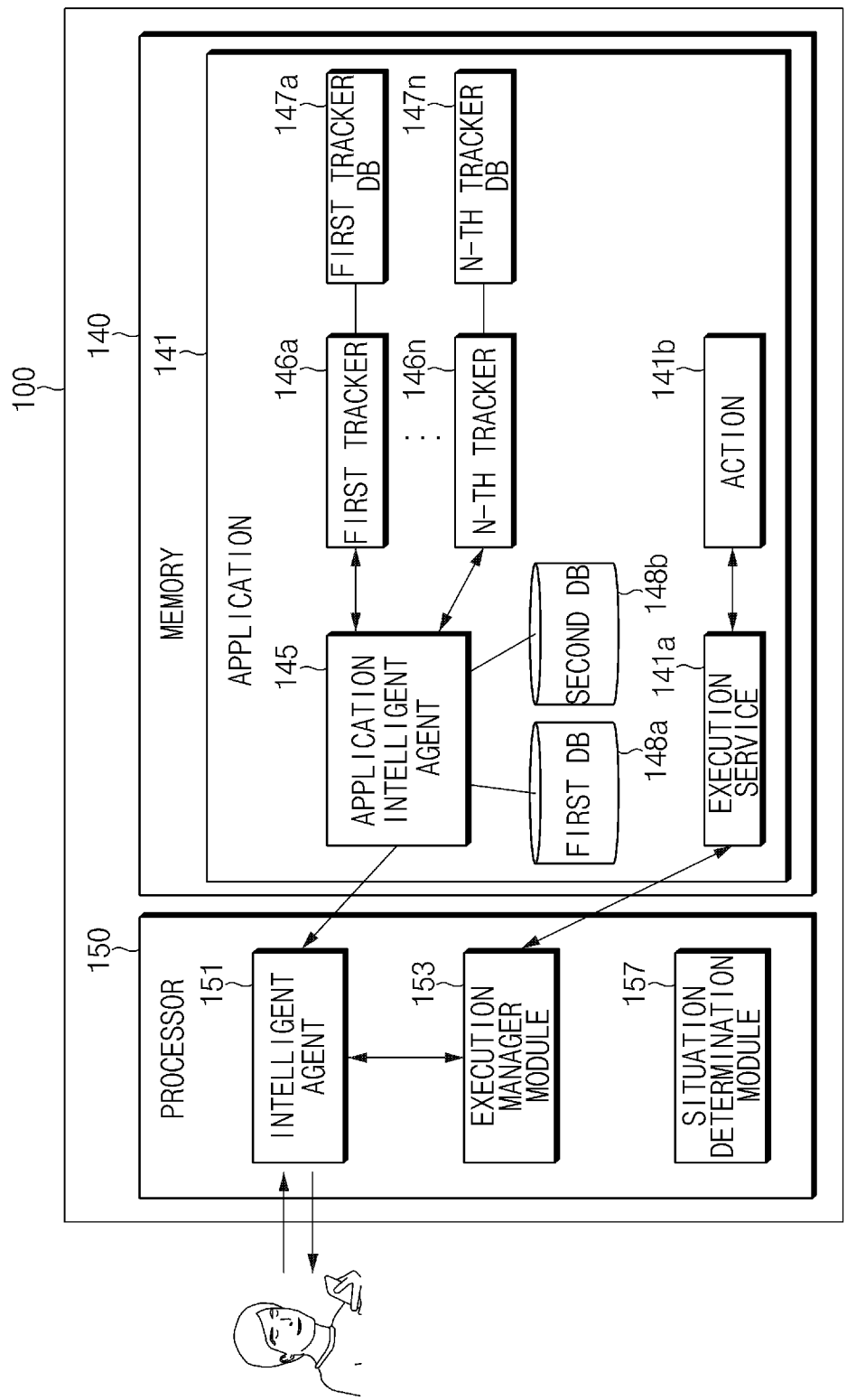
FIG. 8 is a block diagram illustrating a software module of a user terminal, according to an embodiment.

FIG. 8 is a block diagram illustrating a software module of a user terminal, according to an embodiment.

Referring to FIG. 8, the user terminal 100 may include the processor 150, the memory 140, and the like. According to an embodiment, the user terminal 100 may further include at least part of components of the user terminal 100 described above with reference to FIG. 2. According to an embodiment, the processor 150 may include the intelligent agent (e.g., including processing circuitry and/or program elements) 151, the execution manager module (e.g., including processing circuitry and/or program elements) 153, and a situation determination module (e.g., including processing circuitry and/or program elements) 157.

According to an embodiment, the intelligent agent 151 may receive a path rule ID, a state ID, and information about a lacking parameter, from the application intelligent agent 145. According to an embodiment, the intelligent agent 151 may transmit the received information about the lacking parameter to the intelligent server 200 through a wireless communication circuit.

According to an embodiment, the intelligent agent 151 may receive the path rule ID and the state ID from the application intelligent agent 145 and may transmit a path rule corresponding to the received path rule ID and the state ID to the execution manager module 153.

According to an embodiment, the intelligent agent 151 may receive the information about the lacking parameter from the execution manager module 153 and may transmit the received information about the lacking parameter to the intelligent server 200 through the wireless communication circuit.

According to an embodiment, the intelligent agent 151 may receive a message for obtaining the lacking parameter from the intelligent server 200 through the wireless communication circuit and may output the received message through at least one of the display 120 and/or the speaker 130. According to an embodiment, the intelligent agent 151 may receive a message for obtaining the parameter from the application intelligent agent 145 and may output the received message through at least one of the display 120 or the speaker 130.

According to an embodiment, the intelligent agent 151 may receive a user response associated with a first parameter through the display 120 or a microphone. According to an embodiment, the intelligent agent 151 may transmit data associated with the user response to the intelligent server 200 through the wireless communication circuit.

According to an embodiment, the intelligent agent 151 may receive the path rule from the intelligent server 200 through the wireless communication circuit and may transmit the received path rule and the state ID to the execution manager module 153.

According to an embodiment, the intelligent agent 151 may transmit a response for providing a notification of task execution completion, to the intelligent server 200. According to an embodiment, the intelligent agent 151 may receive a message for providing a notification of the task execution completion, from the intelligent server 200. According to an embodiment, the intelligent agent 151 may output the message for providing a notification of the task execution completion, through at least one of the display 120 or the at least one speaker 130.

According to an embodiment, the execution manager module 153 may receive the path rule and the state ID from the intelligent agent 151. According to an embodiment, the execution manager module 153 may transmit information about an operation, which the execution service module 141*a* will perform, based on the path rule and the state ID.

According to an embodiment, the execution manager module 153 may receive the information about the lacking parameter and may transmit the information about the lacking parameter to the intelligent agent 151.

According to an embodiment, the execution manager module 153 may transmit the response for providing a notification of the task execution completion, to the intelligent agent 151.

According to an embodiment, the situation determination module 157 may determine whether a predefined condition is satisfied. According to an embodiment, the predefined condition may be a condition associated with the context information of a user. According to an embodiment, the situation determination module 157 may determine whether the user is capable of responding at a specified point in time. According to an embodiment, even though a predefined event occurs and a parameter is lacking, in the case where the situation determination module 157 determines that the user is exercising, the processor 150 may not output the message for obtaining the parameter.

According to an embodiment, the situation determination module 157 may perform a function the same as or similar to the function that the context module (e.g., the context module 155*a* of FIG. 2) of an intelligent service module (e.g., the intelligent service module 155 of FIG. 2) performs. According to an embodiment, the situation determination module 157 may be replaced with the context module 155*a*.

According to an embodiment, the situation determination module 157 may operate in conjunction with the context module 155*a*. The situation determination module 157 may determine whether the predefined condition is satisfied, using the current states of the apps 141 and 143, which the context module 155*a* collects.

According to an embodiment, the situation determination module 157 may include an information collection unit (not illustrated) and a determination unit (not illustrated).

According to an embodiment, the information collection unit may collect biometric information, context information, demographic information, or feedback information about a notification.

According to an embodiment, the information collection unit may collect the biometric information of the user through the sensor of the user terminal 100 or the sensor of a wearable electronic device. For example, the information collection unit may collect biometric information such as the number of steps, blood glucose level, blood pressure value, stress index, heart rate, oxygen saturation value, skin condition score, or the like of the user.

According to an embodiment, the context information may include state information occurring when the user utilizes an application in a terminal and content information used in the application. For example, the context information may include application usage information, payment history information, search information, or schedule information of the user terminal 100.

According to an embodiment, the demographic information may be recorded into the application providing a notification service, and may include information associated with the user's geographic, social, or economic information such as the age, gender, living area, property, and economic level, which is utilized by the application.

According to an embodiment, the feedback information about a notification may include the content of the notification, the time of the notification, the method of the notification, or information about the user's positive/negative reflection on the notification, as information about feedback reaction at a point in time when the user is notified.

According to an embodiment, the determination unit may determine whether a predefined condition is satisfied, based on at least one of the biometric information, context information, demographic information, or feedback information about the notification of the user, which is collected by the information collection unit.

According to an embodiment, the intelligent server 200 may include a situation determination module (not illustrated) corresponding to the determination unit of the situation determination module 157. The situation determination module of the intelligent server 200 may receive the biometric information, context information, demographic information, or feedback information about a notification, which is collected by the information collection unit of the user terminal 100, and may determine whether the predefined condition is satisfied, based on the received information. The situation determination module of the intelligent server 200 may transmit data associated with whether the predefined condition is satisfied, to the user terminal 100.

According to various embodiments, in the case where the intelligent server 200 includes a situation determination module corresponding to the determination unit of the situation determination module 157, the situation determination module 157 of the user terminal 100 may include only the information collection unit and may not include the determination unit.

According to an embodiment, in the case where the predefined condition is satisfied, the intelligent agent 151 may output a message for obtaining a parameter.

For example, in the case where the heart rate obtained through a heart rate sensor is maintained at 130 bpm and then drops to 70 bpm and in the case where it is determined, through a motion sensor, that the user grips the user terminal 100, the situation determination module 157 may determine that the predefined condition is satisfied. According to an embodiment, the situation determination module 157 may transmit information indicating that predefined condition is satisfied, to the intelligent agent 151. According to an embodiment, the intelligent agent 151 receiving the information indicating that predefined condition is satisfied may output the message for obtaining a parameter.

According to various embodiments, the situation determination module 157 may be included in the application of the user terminal 100 or may be an independent module operating in conjunction with the application. According to various embodiments, the situation determination module 157 may be included in a wearable device connected to the user terminal 100.

According to various embodiments, the intelligent agent 151 of the user terminal 100 may output the message for obtaining a parameter based on data associated with whether the predefined condition received from the intelligent server 200 is satisfied.

According to an embodiment, the memory 140 may store one or more applications. According to an embodiment, the application may be an application for monitoring user information. For example, the application may include an application for monitoring exercise information of the user, an application for monitoring health information of the user, an application for managing a schedule of the user, and the like.

According to an embodiment, the application may include the execution service module 141*a*, the action 141*b*, the application intelligent agent 145, a plurality of DBs 148*a* and 148b, a plurality of trackers 146a to 146n, and a plurality of tracker DBs 147a to 147n.

According to an embodiment, the execution service module 141a may perform the action 141b based on information about the operation to be performed, which is received from the execution manager module 153. According to an embodiment, the execution service module 141a may obtain information about a lacking parameter while performing the operation and may transmit the information about the lacking parameter to the execution manager module 153.

According to an embodiment, after performing the action 141b, the execution service module 141a may transmit a response for providing a notification of execution completion, to the execution manager module 153.

According to an embodiment, the application intelligent agent 145 may determine whether the predefined event has occurred, for the purpose of recording a parameter. According to an embodiment, the predefined event may include at least one of an event associated with time, an event associated with biometric information of the user, or an event associated with the location of the user terminal 100. According to an embodiment, the predefined event may be defined for each of the trackers 146a to 146n or for respective parameters of the trackers 146a to 146n. For example, the predefined event for recording a sleep time parameter may be that 7 a.m. has elapsed. For another example, the predefined event for recording an exercise time parameter may be that the heart rate is less than 80 bpm and a motion is not sensed after the motion is sensed in a state where a heart rate exceeds 130 bpm.

According to an embodiment, the application intelligent agent 145 may determine whether the predefined event has occurred, using biometric information obtained through the sensor of the user terminal 100 or the sensor of an external electronic device.

According to various embodiments, the predefined event may include an event associated with a user input. For example, in the case where the user sets an alarm on every Monday, the predefined event may be that the user has not set an alarm on Monday. In the exemplification, in the case where the alarm is not set on Monday, the application intelligent agent 145 may determine that the predefined event has occurred to record an alarm time parameter.

According to various embodiments, the predefined event may be defined based on user profile information. In an embodiment, the user profile information may include, for example, and without limitation, at least one of a height, a weight, a heart rate, an oxygen saturation, a stress index, a blood glucose index, a blood pressure index, a sleep time, a commute time, a point in time when a health application has been currently executed, a time exposed to ultraviolet light, the number of steps, a walking time, a running time, a bike riding time, a hiking time, the type of food intake, the time/amount of food intake, the time/amount of water intake, and/or the time/amount of caffeine intake, or the like. According to an embodiment, the processor 150 may obtain gene information of the user based on the user profile information. In an embodiment, the processor 150 may store the gene information of the user in the security enhancement (SE) of the memory 140 or may receive the gene information of the user by making a request for the gene information to a server providing the gene information of the user.

According to an embodiment, the application intelligent agent 145 may determine whether the parameter associated with the generated event is included in the tracker DBs 147a to 147n. According to an embodiment, the application intelligent agent 145 may make a request for a parameter to the trackers 146a to 146n associated with the generated predefined event and may receive one or more parameters included in the tracker DBs 147a to 147n, from the trackers 146a to 146n. The application intelligent agent 145 may determine whether the parameter associated with the event is included in the received one or more parameters. For example, the application intelligent agent 145 may receive parameters included in a food tracker DB, from a food tracker associated with 'an event that 8 a.m. elapses'. The application intelligent agent 145 may determine whether a breakfast parameter is included in the received parameters associated with 'the event that 8 a.m. elapses'.

According to an embodiment, the application intelligent agent 145 may transmit a path rule ID corresponding to a lacking parameter, a state ID, and information about the lacking parameter to the intelligent agent 151.

According to an embodiment, the application intelligent agent 145 may further transmit a message for obtaining the parameter, to the intelligent agent 151. According to an embodiment, the application intelligent agent 145 may obtain the message corresponding to the lacking parameter from the second DB 148b and may transmit the obtained message to the intelligent agent 151.

According to an embodiment, the application intelligent agent 145 may transmit the path rule ID and the state ID to the intelligent agent 151.

According to an embodiment, a plurality of the trackers 146a to 146n may obtain a plurality of parameters and may store the parameter obtained from each of the corresponding plurality of tracker DBs 147a to 147n.

According to an embodiment, a plurality of trackers may include at least one of a food tracker, a water tracker, a caffeine tracker, a weight tracker, a sleep tracker, a heart rate tracker, a blood glucose tracker, or a blood pressure tracker. According to an embodiment, the tracker may receive the parameter that a third party application obtains.

According to an embodiment, the sleep tracker may obtain at least one of the bedtime of the user, the wake-up time of the user, or the sleep time of the user. According to an embodiment, a plurality of trackers may include information about the predefined event for recording a parameter for each parameter. For example, the food tracker may include information about 'the event that 8 a.m. elapses' for obtaining a breakfast parameter and information about 'the event that 1 p.m. elapses' for obtaining a lunch parameter.

According to an embodiment, a plurality of DBs may include the first DB 148a and the second DB 148b.

According to an embodiment, the first DB 148a may include user profile information.

For example, the user profile information may include, for example, and without limitation, the height, the weight, the heart rate, the oxygen saturation, the stress index, the blood glucose index, the blood pressure index, the sleep time, the commute time, the point in time when a health application has been recently executed, the time exposed to ultraviolet light, the number of steps, the walking time, the running time, the bike riding time, the hiking time, the type of food intake, the time/amount of food intake, the time/amount of water intake, the time/amount of caffeine intake, or the like, of the user.

According to an embodiment, the first DB 148a may further include information about the predefined event for checking whether each of a plurality of parameters is recorded. For example, the first DB may further include information about 'the event that 8 a.m. elapses' for checking whether the breakfast parameter is recorded, information about 'the event that 1 p.m. elapses' for checking whether the lunch parameter is recorded, and information about 'the event that 8 p.m. elapses' for checking whether a dinner parameter is recorded.

According to an embodiment, the application 141 may further include an additional DB, and information about the predefined event for checking whether each of a plurality of parameters is recorded may be included in the additional DB.

According to an embodiment, the second DB 148b may include at least one of a state ID, a screen ID, an application path rule, or a message for obtaining a parameter, which corresponds to each of a plurality of parameters. According to an embodiment, the state ID may be an identifier indicating the current operating state of the user terminal 100. According to an embodiment, the screen ID may be an identifier indicating the current screen of the user terminal 100. According to an embodiment, the application path rule may be the sequence (or the sequence of actions) of states for the intelligent agent 151 to perform a task.

According to an embodiment, the second DB 148b may further include a path rule ID corresponding to each of the plurality of parameters. In an embodiment, the path rule ID may be an identifier corresponding to each of a plurality of path rules that the intelligent server 200 includes.

According to an embodiment, the processor 150 may automatically record (register) one or more parameters into the application based on information obtained through a sensor. For example, the processor 150 may, for example, and without limitation, record (register) a bedtime, a wake-up time, and/or a sleep time, or the like in the application based on motion information obtained through a motion sensor.

According to an embodiment, the processor 150 may record a parameter into the application based on a user input obtained through the touchscreen display 120 or a microphone. For example, the processor 150 may receive a lunch menu through a text input and may record the lunch menu into the application.

According to an embodiment, one or more parameters may be included in the tracker DBs 147a to 147n of an application.

In operation 903, the processor 150 may determine whether the predefined event occurs for the registration of a first parameter and whether the first parameter associated with the event is recorded (registered) into the application.

According to an embodiment, the predefined event may include, for example, and without limitation, at least one of an event associated with time, an event associated with

TABLE 2 illustrates the second DB 148b, according to an embodiment.

| Parameter | State ID | Screen ID | Path rule ID | Application path rule | Message |
|---|---|---|---|---|---|
| Water intake | Water Tracker Add | 27.1 Water Tracker | Samsung Health 4 | ME- WaterTrack-WaterAdd | How many glasses did you drink today? |
| Sleep time | Sleep Tracker Add | 25.1 Sleep Track | Samsung Health 8 | ME-SleepTrack-SleepTrackRecord | How many hours did you sleep last night? |
| Breakfast | Food Breakfast | 26.3 Food Breakfast | Samsung Health 12 | ME-FoodTrack-FoodBreakfastRecord | What did you eat in the morning? |

As illustrated in Table 2, the second DB 148b may further include a path rule ID corresponding to each of the plurality of parameters.

According to an embodiment, the first DB 148a and the second DB 148b may be included in one DB.

Figure 9A:
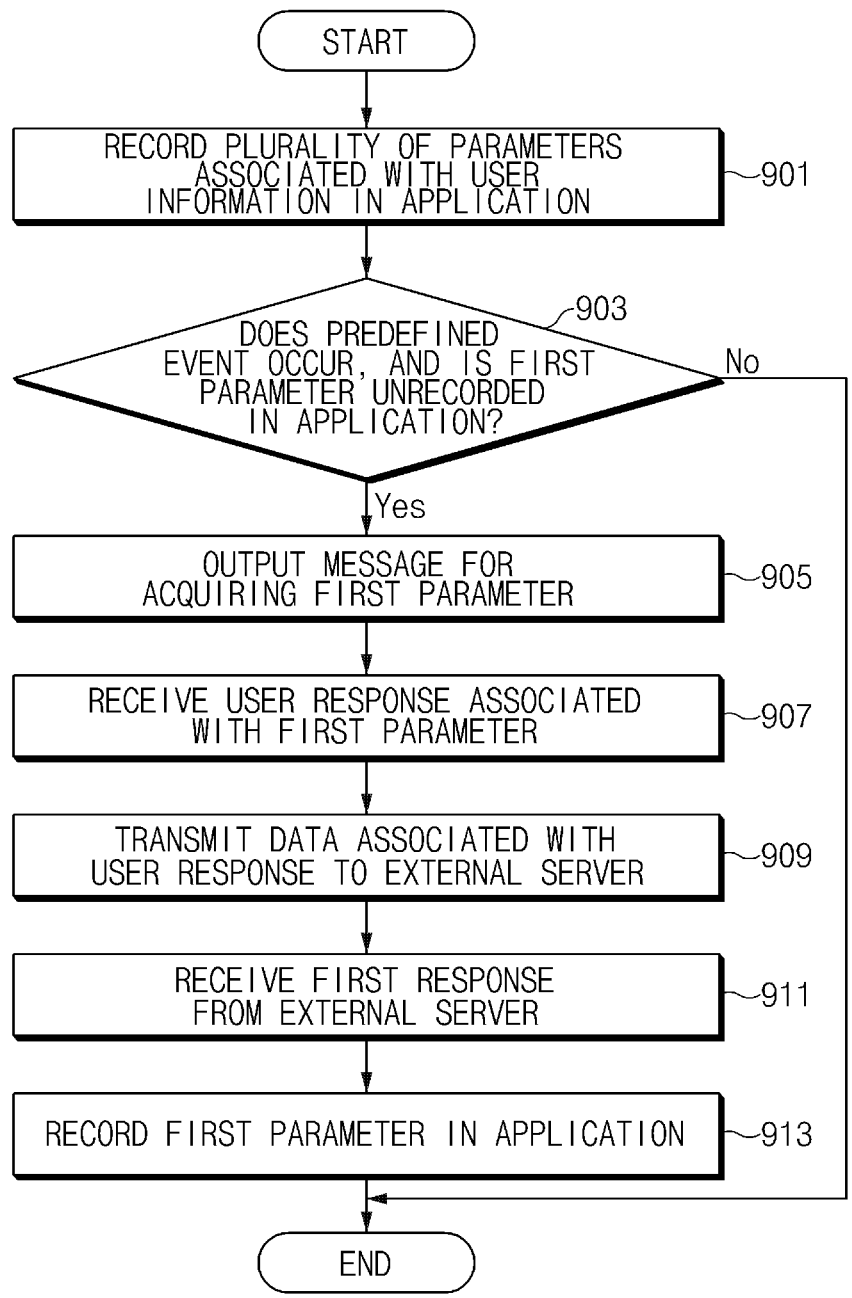
FIG. 9A is a flowchart illustrating a method of obtaining and recording a lacking parameter in an application, according to an embodiment.

FIG. 9A is a flowchart illustrating a method of obtaining and recording a lacking parameter in an application, according to an embodiment.

According to an embodiment, an operation of recording a parameter in an application may include an operation of storing the obtained parameter in a memory (e.g., at least one of the first to n-th tracker DBs 147a to 147n) in conjunction with the application.

Hereinafter, it is assumed that the user terminal 100 described with reference to FIGS. 2 and 8 performs the process of FIG. 9A. In addition, in descriptions of FIG. 9A, it is understood that the operation described as being performed by the user terminal 100 is controlled by the processor 150 of the user terminal 100. The operation described as being performed by the user terminal 100 may be implemented with instructions capable of being performed (or executed) by the processor 150 of the user terminal 100. For example, the instructions may be stored in a computer-readable recording medium or the memory 140 of the user terminal 100 illustrated in FIG. 2 or 8.

In operation 901, the processor 150 may record (register) one or more parameters associated with user information in an application automatically and/or based on a user input.

biometric information of the user, and/or an event associated with the location of the user terminal 100, or the like. For example, the event associated with time may include an event that a pre-specified time elapses, an event that the time belongs to a pre-specified time range, or the like. For another example, an event associated with biometric information of the user may be that the heart rate of the user obtained from a sensor exceeds 130 bpm. For another example, an event associated with the location of the user terminal 100 may be that the user terminal 100 is positioned at a pre-specified place, or the like.

According to an embodiment, the processor 150 may determine whether the first parameter associated with the generated event is recorded into the application. For example, when 7 a.m. elapses, the processor 150 may determine whether a wake-up time parameter is recorded into the application. In other words, the application intelligent agent 145 may make a request for a parameter to a sleep tracker and may receive a sleep time parameter, a bedtime parameter, and a sleep level parameter, which are included in a sleep tracker DB, from the sleep tracker. Since the received parameters do not include a wake-up time parameter, the application intelligent agent 145 may determine that the wake-up time parameter is not recorded.

According to an embodiment, in the case where the predefined event for the registration of a first parameter occurs and in the case where the first parameter is not recorded into the application, in operation 905, the processor 150 may output a message for obtaining a first parameter through at least one of the touchscreen display 120 or the speaker 130.

According to an embodiment, before outputting a message for obtaining the first parameter, the processor 150 may transmit information about the lacking first parameter to the intelligent server 200 through a wireless communication circuit. According to an embodiment, the processor 150 may receive the message for obtaining the first parameter from the intelligent server 200 through the wireless communication circuit and may output the received message.

According to an embodiment, the processor 150 may output the message for obtaining the first parameter stored in the memory 140. According to an embodiment, the processor 150 may obtain the message corresponding to the lacking parameter from the second DB 148b.

According to an embodiment, in the case where the predefined condition associated with the context information of the user is satisfied, the processor 150 may output the message. In an embodiment, the predefined condition may include a condition associated with the biometric information of the user.

For example, the predefined condition may be that the heart rate of the user is in a range of 60 bpm to 80 bpm and the user terminal 100 is gripped by the user. According to an embodiment, in the case where the heart rate obtained through a heart rate sensor is maintained at 130 bpm and then drops to 70 bpm and in the case where it is determined, through a motion sensor, that the user grips the user terminal 100, the situation determination module 157 may determine that the predefined condition is satisfied. According to an embodiment, since the predefined condition is satisfied, the intelligent agent 151 may output the message.

Figure 9B:
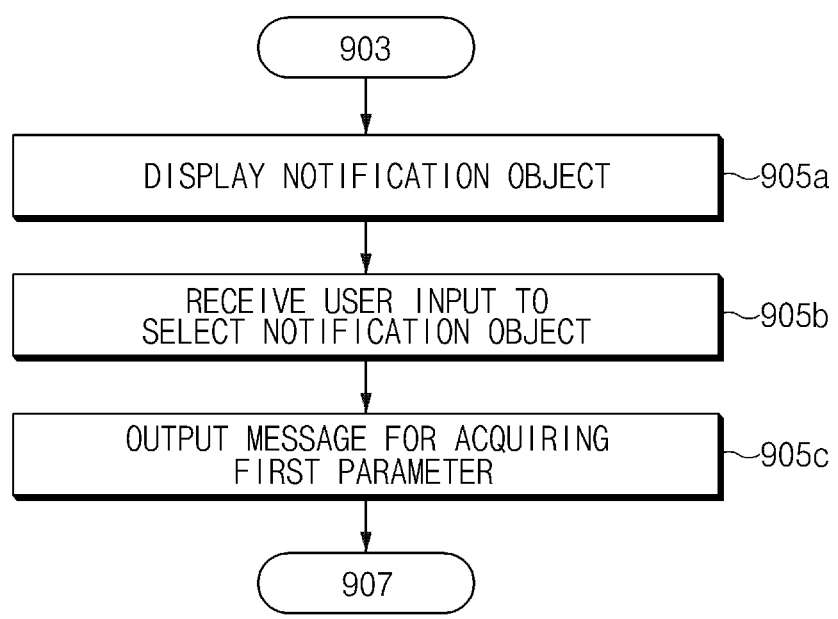
FIG. 9B is a flowchart illustrating a method of displaying a notification object and outputting a message for obtaining a first parameter, according to an embodiment.

FIG. 9B is a flowchart illustrating a method of displaying a notification object and outputting a message for obtaining a first parameter, according to an embodiment.

According to an embodiment, operation 905 may include operation 905a to operation 905c.

After operation 903, in operation 905a, the notification object may be displayed on the display 120.

In operation 905b, the processor 150 may receive a user input to select the notification object.

According to an embodiment, when displaying the notification object, the processor 150 may output at least one of a sound notification or a vibration notification. According to an embodiment, when displaying the notification object, the processor 150 may output a notification signal through a notification LED (not illustrated) of the user terminal 100.

In operation 905c, the processor 150 may output the message for obtaining (e.g., acquiring) a first parameter, in response to the reception of the user input.

Figure 10A:
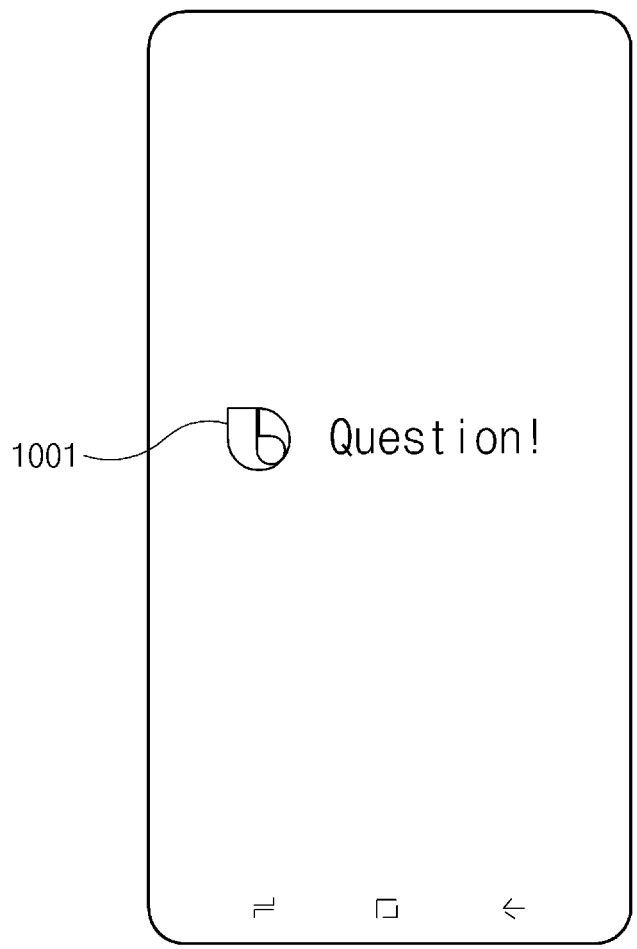
FIG. 10A is a diagram illustrating a screen on which a notification object is displayed, according to an embodiment.
Figure 10B:
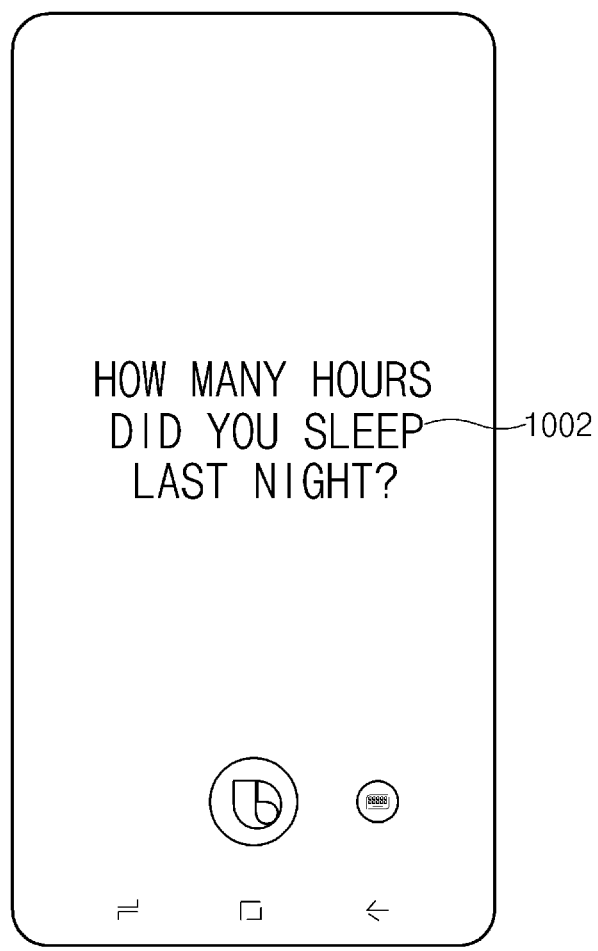
FIG. 10B is a diagram illustrating a screen on which a message for obtaining a parameter is displayed, according to an embodiment.

FIG. 10A is a diagram illustrating a screen on which a notification object is displayed, according to an embodiment. FIG. 10B is a diagram illustrating a screen on which a message for obtaining a parameter is displayed, according to an embodiment.

According to an embodiment, before outputting a message for obtaining a first parameter, as illustrated in FIG. 10A, the processor 150 may display a notification object 1001 on the touchscreen display 120 (e.g., operation 905a).

According to an embodiment, when displaying the notification object 1001, the processor 150 may output a notification signal through a notification LED (not illustrated) of the user terminal 100. According to an embodiment, when displaying the notification object 1001, the processor 150 may output a sound saying that "Bixby question" through the speaker 130. According to an embodiment, when displaying the notification object 1001, the processor 150 may output a vibration notification.

According to an embodiment, when a user input to select the notification object 1001 is input (e.g., operation 905b), as illustrated in FIG. 10B, the processor 150 may display a message 1002 for obtaining the first parameter on the display 120 (e.g., operation 905c).

Figure 11A:
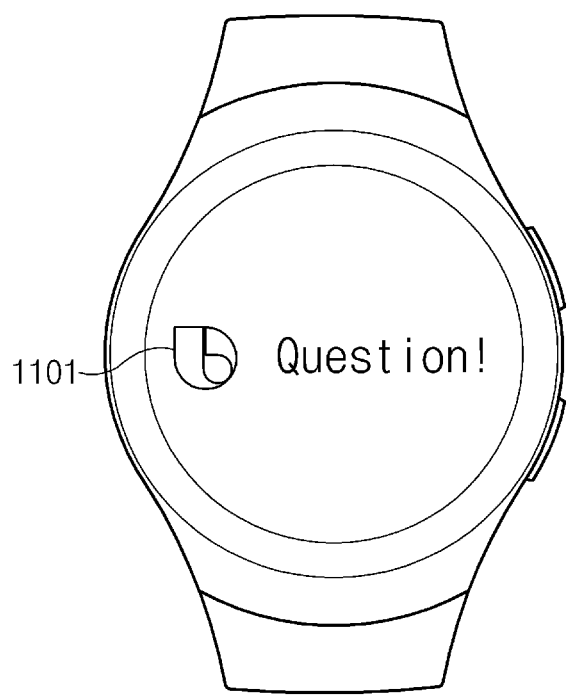
FIG. 11A is a diagram illustrating an external electronic device displaying a notification object, according to an embodiment.
Figure 11B:
FIG. 11B is a diagram illustrating an external electronic device displaying a message for obtaining a parameter, according to an embodiment.

FIG. 11A is a diagram illustrating an external electronic device displaying a notification object, according to an embodiment. FIG. 11B is a diagram illustrating an external electronic device displaying a message for obtaining a parameter, according to an embodiment.

According to various embodiments, the processor 150 of the user terminal 100 may output a message for obtaining a first parameter, through an external electronic device. For example, the processor 150 of the user terminal 100 may transmit the message for obtaining the first parameter to an external electronic device through a wireless communication circuit, and the external electronic device may display the received message on a display.

According to various embodiments, as illustrated in FIG. 11A, the processor 150 of the user terminal 100 may display a notification object 1101 on the touchscreen display of the external electronic device.

According to an embodiment, when the user input to select the notification object 1101 is received, as illustrated in FIG. 11B, the processor 150 may display a message 1102 for obtaining the first parameter, on the display of the external electronic device.

Returning to FIG. 9A, in operation 907, the processor 150 may receive a user response associated with the first parameter through the touchscreen display 120 or a microphone.

According to an embodiment, the user response may be a text input through the touchscreen display 120 or a voice input through the microphone.

For example, after outputting a message for obtaining a sleep time, saying that "How many hours did you sleep last night?", the processor 150 may receive a voice input saying that "6 hours" as a user response associated with the sleep time.

In operation 909, the processor 150 may transmit data associated with the user response to an external server through a wireless communication circuit.

According to an embodiment, the external server may correspond to the above-described intelligent server 200.

According to an embodiment, the data associated with the user response may include a voice signal corresponding to the user response or a text corresponding to the user response.

According to an embodiment, the processor 150 may transmit context information indicating a current state of the user terminal 100 to the external server through the wireless communication circuit. For example, the context information may include information of an app being executed, state information of an app being executed, or the like. In an embodiment, state information of an app may include a state ID, specific screen information (screen ID) of an app, state information on a specific screen, or the like.

In operation 911, the processor 150 may receive a first response from the external server through the wireless communication circuit.

According to an embodiment, the first response may include a path rule for recording the first parameter into the application. The path rule may include information about a sequence of states for the user terminal 100 to perform a task.

In operation 913, the processor 150 may record (register) the first parameter into the application.

According to an embodiment, the processor 150 may perform a task to record the first parameter into the application, depending on the path rule, and the task to record the parameter may include an operation of storing the first parameter in a memory (e.g., at least one of the first to n-th tracker DBs 147a to 147n), in conjunction with the application.

According to an embodiment, after operation 913, the processor 150 may transmit a second response including information about registration completion of the first parameter, to the external server through the wireless communication circuit. According to an embodiment, the processor 150 may receive a message for providing a notification of the registration completion of the first parameter, from the external server through the wireless communication circuit. According to an embodiment, the processor 150 may output the message for providing a notification of the registration completion of the first parameter, through at least one of the touchscreen display 120 or the at least one speaker 130.

Figure 12:
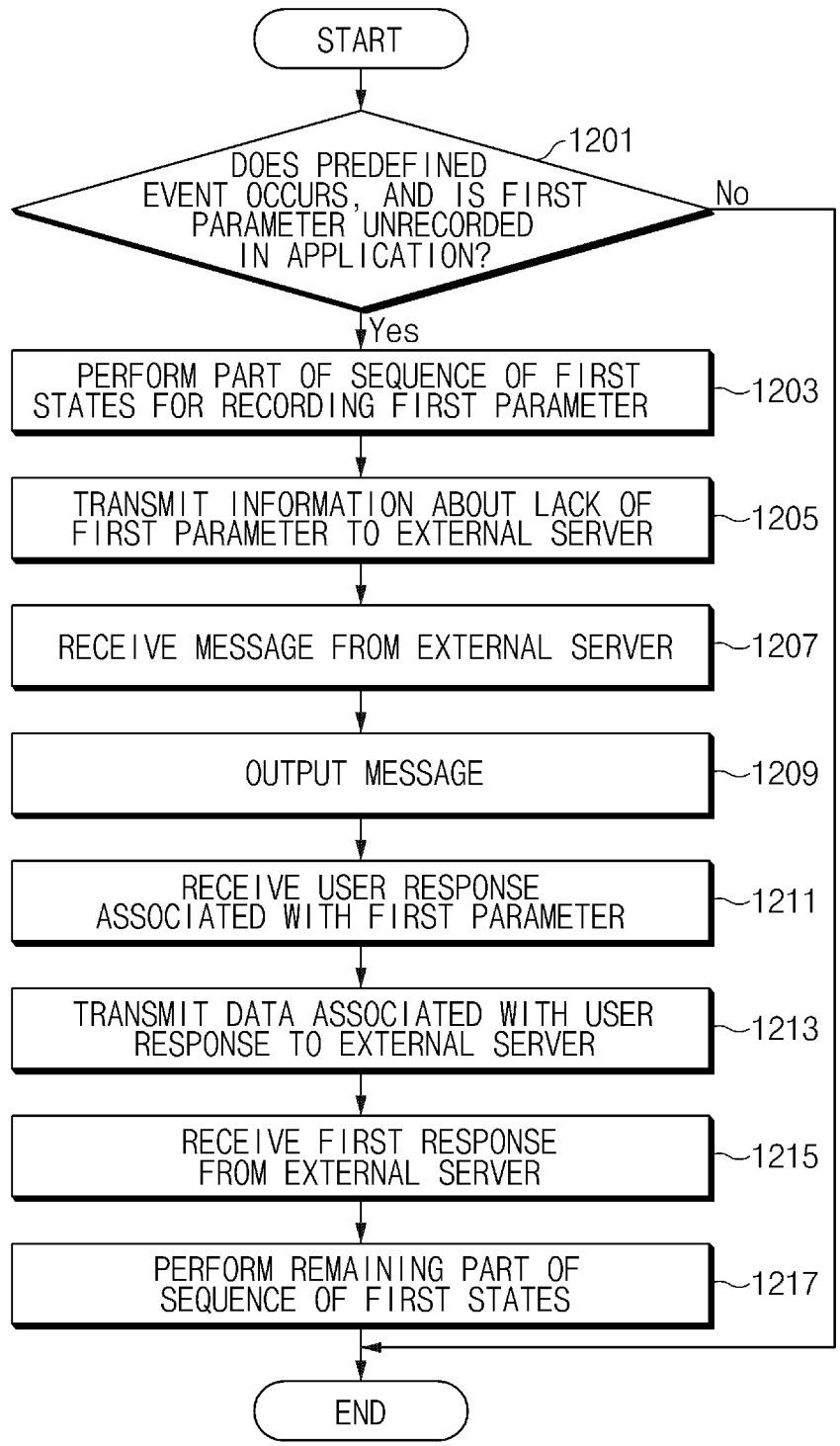
FIG. 12 is a flowchart illustrating a method of obtaining and recording a lacking parameter in an application, according to an embodiment.

FIG. 12 is a flowchart illustrating a method of obtaining and recording a lacking parameter in an application, according to an embodiment.

Hereinafter, it is assumed that the user terminal 100 described with reference to FIGS. 2 and 8 performs the process of FIG. 12. In addition, in descriptions of FIG. 12, it is understood that the operation described as being performed by the user terminal 100 is controlled by the processor 150 of the user terminal 100.

The operation may be implemented with instructions capable of being performed (or executed) by the processor 150 of the user terminal 100. For example, the instructions may be stored in a computer-readable recording medium or the memory 140 of the user terminal 100 illustrated in FIG. 2 or 8.

Before operation 1201, the processor 150 may record a plurality of parameters associated with user information in an application automatically or based on a user input. According to an embodiment, an operation of recording a plurality of parameters associated with the user information may correspond to operation 901.

According to an embodiment, an operation of recording a parameter may include an operation of storing the first parameter in a memory (e.g., at least one of the first to n-th tracker DBs 147a to 147n) in conjunction with an application.

In operation 1201, the processor 150 may determine whether the predefined event occurs for the registration of a first parameter and whether the first parameter is recorded into the application.

According to an embodiment, the processor 150 may determine whether the predefined event occurs. In the case where the predefined event occurs, the processor 150 may determine whether the first parameter associated with the generated event is recorded into the application. According to an embodiment, the application intelligent agent 145 may determine whether the first parameter associated with the generated event is included in the tracker DBs 147a to 147n.

According to an embodiment, operation 1201 may correspond to above-described operation 903, and embodiments capable of being applied to operation 903 may be applied to operation 1201.

According to an embodiment, in the case where the predefined event for the registration of a first parameter occurs and in the case where the first parameter is not recorded into the application, in operation 1203, the processor 150 may perform a part of the sequence of first states for recording the first parameter into the application.

According to an embodiment, the processor 150 may obtain the path rule ID corresponding to the lacking parameter from the second DB 148b. According to an embodiment, the processor 150 may perform an operation according to the path rule corresponding to the obtained path rule ID. In other words, the processor 150 may perform the sequence of the first states based on information about the sequence of the first states that a path rule includes. According to an embodiment, since the first parameter is lacking, the processor 150 may stop at a state where the first parameter is required while performing the sequence of the first states.

According to an embodiment, the processor 150 may obtain information about a lacking first parameter by performing a part of the sequence of the first states. For example, while performing the sequence of the first states to store a sleep time, the processor 150 stop at a state where a sleep time parameter is required, and may obtain information indicating that the sleep time parameter is lacking.

In operation 1205, in a state where the first parameter is required, the processor 150 may transmit information about the lacking first parameter to an external server through a wireless communication circuit.

According to an embodiment, the external server may correspond to the above-described intelligent server 200.

According to an embodiment, the processor 150 may transmit the information about a lacking first parameter obtained by performing a part of the sequence of the first states.

In operation 1207, the processor 150 may receive a message for obtaining the first parameter, from the external server.

In operation 1209, the processor 150 may output the message for obtaining the received first parameter, through at least one of the touchscreen display 120 or the speaker 130.

According to an embodiment, operation 1209 may correspond to above-described operation 905, and embodiments capable of being applied to operation 905 may be applied to operation 1209.

For example, in the case where the predefined condition associated with the context information of the user is satisfied, the processor 150 may output the message.

For another example, before outputting the message for obtaining the first parameter, the processor 150 may display a notification object on the display 120. According to an embodiment, when a user input to select the notification object is received, the processor 150 may output the message.

According to various embodiments, the processor 150 may output a message for obtaining a first parameter, through an external electronic device.

In operation 1211, the processor 150 may receive a user response associated with the first parameter through the touchscreen display 120 or a microphone.

According to an embodiment, operation 1211 may correspond to above-described operation 907, and embodiments capable of being applied to operation 907 may be applied to operation 1211.

In operation 1213, the processor 150 may transmit data associated with the user response to an external server through a wireless communication circuit.

According to an embodiment, operation 1213 may correspond to above-described operation 909, and embodiments capable of being applied to operation 909 may be applied to operation 1213.

In operation 1215, the processor 150 may receive a first response from the external server through the wireless communication circuit.

According to an embodiment, the first response may include a path rule for recording the first parameter into the application. The path rule may include information about a sequence of second states for the user terminal 100 to perform a task.

According to an embodiment, the path rule included in the first response may include information about a part of the sequence of first states, which is already performed.

In operation 1217, the processor 150 may perform the remaining part of the sequence of first states by allowing an electronic device to have the sequence of the second states.

According to an embodiment, the processor 150 may perform a task to record the first parameter into the application from a state where the first parameter is required, without performing a part of the sequence of first states, which is already performed in operation 1203. According to an embodiment, the recorded first parameter may be stored in the first tracker DB 147*a*.

Figure 13:
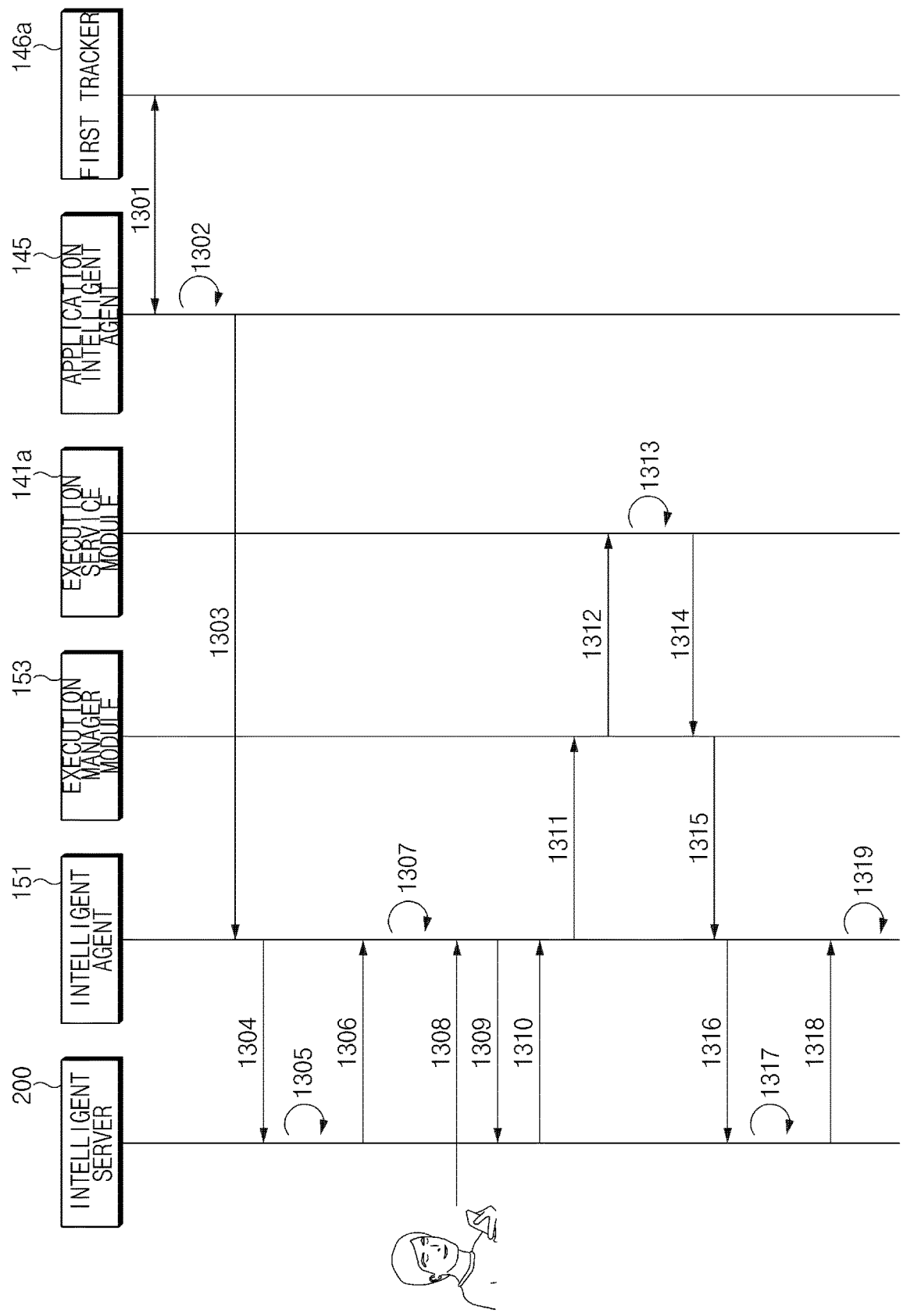
FIG. 13 is a flowchart illustrating a method of obtaining and recording a lacking parameter in an application, according to an embodiment.

FIG. 13 is a flowchart illustrating a method of obtaining and recording a lacking parameter in an application, according to an embodiment.

According to an embodiment, operations illustrated in FIG. 13 may be operations of the user terminal 100 and the intelligent server 200 for performing a method of recording a parameter, which is described with reference to FIG. 9A.

According to an embodiment, the intelligent agent 151, the execution manager module 153, the execution service module 141*a*, the application intelligent agent 145, the first tracker 146*a*, and the intelligent server 200 of FIG. 13 may perform an operation at least partly similar to an operation performed by each of components described with reference to FIGS. 1 to 8.

In operation 1301, the application intelligent agent 145 may determine whether the predefined event for recording a first parameter occurs, based on information about the predefined event. According to an embodiment, the application intelligent agent 145 may determine whether the parameter is recorded in the first tracker DB (e.g., the first tracker DB 147*a* of FIG. 8). In an embodiment, the application intelligent agent 145 may determine whether the first parameter associated with the generated event is included in the first tracker DB 147*a*. According to an embodiment, the application intelligent agent 145 may make a request for a parameter to the first tracker 146*a* associated with the generated predefined event and may receive one or more parameters included in the first tracker DB 147*a*, from the first tracker 146*a*. The application intelligent agent 145 may determine whether the parameter associated with the event is included in the received one or more parameters.

In the case where the predefined event occurs and in the case where the first parameter is not recorded in the first tracker DB 147*a*, in operation 1302, the application intelligent agent 145 may obtain path rule information corresponding to the first parameter from the second DB 148*b* (e.g., the second DB 148*b* of FIG. 8). According to an embodiment, the path rule information may include a path rule ID, a state ID, and information about the lacking first parameter, which correspond to the first parameter.

According to an embodiment, for the purpose of determining a plurality of parameters to be recorded, after operation 1302, the processor 150 may perform operation 1301 again.

In operation 1303, the application intelligent agent 145 may transmit a path rule ID, a state ID, and information about the lacking first parameter to the intelligent agent 151.

In operation 1304, the intelligent agent 151 may transmit the information about the lacking first parameter to the intelligent server 200 through a wireless communication circuit. According to an embodiment, the intelligent agent 151 may further transmit at least one of the path rule ID or the state ID, which is transmitted in operation 1303, to the intelligent server 200 through the wireless communication circuit. According to an embodiment, the intelligent agent 151 may request the intelligent server 200 to transmit a message for obtaining the first parameter.

In operation 1305, the intelligent server 200 may generate the message for obtaining the first parameter, based on the received information about the first parameter. According to an embodiment, the intelligent server 200 may generate the message for obtaining the first parameter, further based on at least one of the path rule ID or the state ID, which is received in operation 1304.

In operation 1306, the intelligent server 200 may transmit the message for obtaining the first parameter, to the intelligent agent 151.

In operation 1307, the intelligent agent 151 may output the message for obtaining the first parameter, through at least one of the display 120 or the speaker 130.

In operation 1308, the intelligent agent 151 may receive a user response associated with a first parameter through the display 120 or a microphone.

In operation 1309, the intelligent agent 151 may transmit data associated with the user response to the intelligent server 200 through the wireless communication circuit.

In operation 1310, the intelligent server 200 may transmit a path rule based on data associated with the user response, to the intelligent agent 151.

According to an embodiment, the intelligent server 200 may determine the path rule, further based on at least one of the path rule ID or the state ID, which is received in operation 1304.

In operation 1311, the intelligent agent 151 may transmit the path rule and the state ID to the execution manager module 153. According to an embodiment, the intelligent agent 151 may transmit the path rule received from the intelligent server 200 and the state ID received from the application intelligent agent 145, to the execution manager module 153.

In operation 1312, the execution manager module 153 may transmit information about the operation to be executed based on the path rule and the state ID, to the execution service module 141*a*.

In operation 1313, the execution service module 141*a* may perform an operation based on information, which is received from the execution manager module 153, about an operation to be executed. For example, the execution service module 141*a* may perform an operation using a function corresponding to each state based on the information about the operation to be executed.

According to an embodiment, in the case where there are a plurality of parameters to be recorded, after operation 1313, operation 1307 may be performed again.

After performing an operation, in operation 1314, the execution service module 141*a* may transmit a response for providing a notification of execution completion, to the execution manager module 153.

When all the executions of operations according to the path rule are completed, in operation 1315, the execution manager module 153 may transmit a response for providing a notification of task execution completion, to the intelligent agent 151.

In operation 1316, the intelligent agent 151 may transmit the response for providing a notification of task execution completion, to the intelligent server 200 through the wireless communication circuit.

In operation 1317, the intelligent server 200 may generate the message for providing a notification of task execution completion, based on the response for providing a notification of task execution completion.

In operation 1318, the intelligent server 200 may transmit the message for providing a notification of task execution completion, to the intelligent agent 151.

Figure 14:
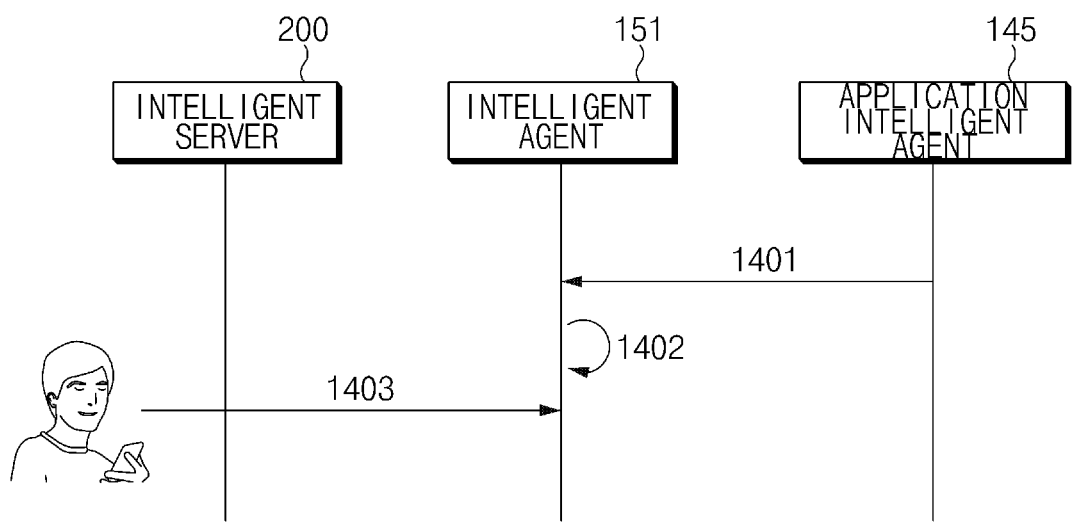
FIG. 14 is a flowchart illustrating a method in which an intelligent agent outputs a message for obtaining a first parameter, according to an embodiment.

In operation 1319, the intelligent agent 151 may output the message for providing a notification of the task execution completion, through at least one of the display 120 or the at least one speaker 130. FIG. 14 is a flowchart illustrating a method in which the intelligent agent 151 outputs a message for obtaining a first parameter, according to an embodiment.

According to an embodiment, above-described operation 1303 to operation 1308 may be replaced with operation 1401 to operation 1403 of FIG. 14.

According to an embodiment, the intelligent agent 151, the application intelligent agent 145, and the intelligent server 200 of FIG. 14 may perform an operation at least partly similar to an operation performed by each of components described with reference to FIGS. 1 to 8.

Before operation 1401, in operation 1301, the application intelligent agent 145 may determine whether the predefined event for recording a first parameter occurs, based on information about the predefined event. In the case where the predefined event occurs and in the case where the first parameter is not recorded in the first tracker DB 147a, in operation 1302, the application intelligent agent 145 may obtain path rule information corresponding to the first parameter from the second DB 148b (e.g., the second DB 148b of FIG. 8).

After operation 1302, in operation 1401, the application intelligent agent 145 may transmit the obtained path rule information to the intelligent agent 151. According to an embodiment, the path rule information may include a path rule ID, a state ID, and information about a lacking first parameter. According to an embodiment, the application intelligent agent 145 may obtain the message corresponding to the lacking first parameter from the second DB 148b and may transmit the obtained message to the intelligent agent 151.

In operation 1402, the intelligent agent 151 may output the received message for obtaining the first parameter, through at least one of the display 120 or the speaker 130.

In operation 1403, the intelligent agent 151 may receive a user response associated with a first parameter through the display 120 or a microphone. After operation 1403, in operation 1309, the intelligent agent 151 may transmit data associated with the user response to the intelligent server 200 through the wireless communication circuit.

According to an embodiment, the intelligent agent 151 may further transmit at least one of the path rule ID or the state ID, which is transmitted in operation 1401, to the intelligent server 200 through the wireless communication circuit.

In operation 1310, the intelligent server 200 may transmit a path rule based on data associated with the user response, to the intelligent agent 151.

According to an embodiment, the intelligent server 200 may determine the path rule, further based on at least one of the path rule ID or the state ID, which is received in operation 1309.

In operation 1311, the intelligent agent 151 may transmit the path rule and the state ID to the execution manager module 153. According to an embodiment, the intelligent agent 151 may transmit the path rule received from the intelligent server 200 and the state ID received from the application intelligent agent 145, to the execution manager module 153.

In operation 1312, the execution manager module 153 may transmit information about the operation to be executed based on the path rule and the state ID, to the execution service module 141a.

In operation 1313, the execution service module 141a may perform an operation based on information, which is received from the execution manager module 153, about an operation to be executed.

After performing an operation, in operation 1314, the execution service module 141a may transmit a response for providing a notification of execution completion, to the execution manager module 153.

When all the executions of operations according to the path rule are completed, in operation 1315, the execution manager module 153 may transmit a response for providing a notification of task execution completion, to the intelligent agent 151.

In operation 1316, the intelligent agent 151 may transmit the response for providing a notification of task execution completion, to the intelligent server 200 through the wireless communication circuit.

In operation 1317, the intelligent server 200 may generate the message for providing a notification of task execution completion, based on the response for providing a notification of task execution completion.

In operation 1318, the intelligent server 200 may transmit the message for providing a notification of task execution completion, to the intelligent agent 151.

In operation 1319, the intelligent agent 151 may output the message for providing a notification of the task execution completion, through at least one of the display 120 or the at least one speaker 130.

Hereinafter, an embodiment of above-described operation 1301 to operation 1319 and operation 1401 to operation 1403 is described. In an embodiment, a predefined event for the food tracker 146a to record breakfast being a first parameter may be that 8 a.m. elapses, and a predefined event for the sleep tracker 146a to record a wake-up time being a second parameter may be that 7 a.m. elapses. In an embodiment, it is assumed that the current time is 8:30 AM and breakfast and a wake-up time are not recorded into the application.

In operation 1301, the application intelligent agent 145 may determine that 8 a.m. for recording the first parameter elapses currently and 7 a.m. for recording the second parameter elapses currently. The application intelligent agent 145 may determine that breakfast and the wake-up time are not respectively recorded in the first tracker DB 147a and the second tracker DB 147b.

In operation 1302, the application intelligent agent 145 may obtain the path rule ID corresponding to breakfast, a state ID, and information about a breakfast parameter, from the second DB 148b. The application intelligent agent 145 may obtain a path rule ID corresponding to the wake-up time, a state ID, and information about a wake-up time parameter, from the second DB 148*b*.

In operation 1303, the application intelligent agent 145 may transmit a path rule ID, a state ID, and information about a lacking breakfast parameter, which correspond to breakfast, and a path rule ID, a state ID, and information about a lacking wake-up time, which correspond to wake-up time, to the intelligent agent 151.

In operation 1304, the intelligent agent 151 may transmit information about the lacking breakfast parameter and information about the lacking wake-up time parameter, to the intelligent server 200 through the wireless communication circuit. According to an embodiment, the intelligent agent 151 may further transmit the path rule ID and the state ID, which correspond to breakfast, and the path rule ID and the state ID, which correspond to wake-up time, to the intelligent server 200 through the wireless communication circuit.

In operation 1305, the intelligent server 200 may generate a message (e.g., "What did you eat in the morning?") for obtaining a breakfast parameter and a message (e.g., "What time did you wake up this morning?) for obtaining a wake-up time parameter, based on information about the received breakfast parameter and information about the received wake-up time parameter.

In operation 1306, the intelligent server 200 may transmit the message for obtaining a breakfast parameter and the message for obtaining a wake-up time parameter, to the intelligent agent 151.

In operation 1307, the intelligent agent 151 may output the message for obtaining the breakfast parameter, through at least one of the display 120 or the speaker 130.

Figure 15A:
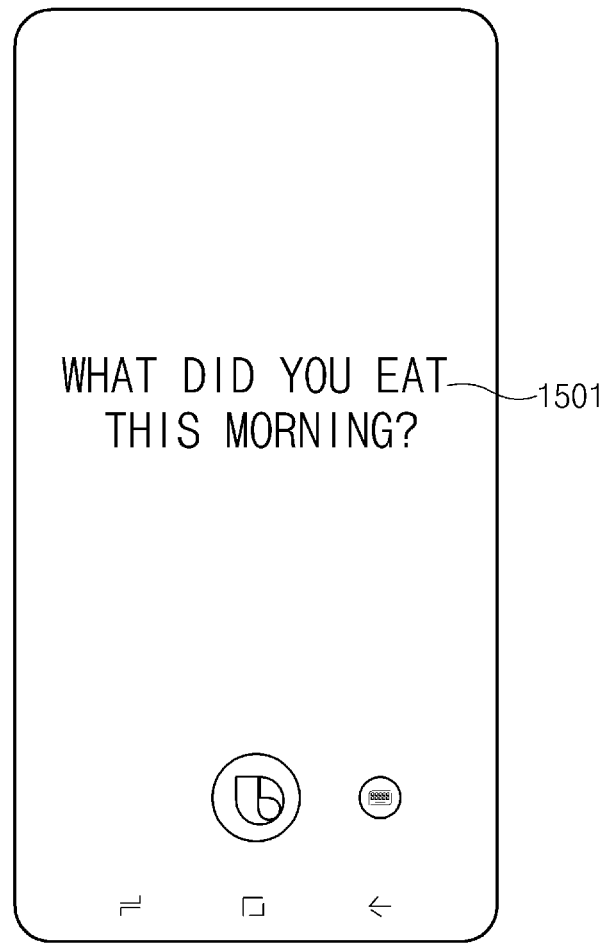
FIG. 15A is a diagram illustrating a screen on which a message for obtaining a lacking first parameter is displayed, according to an embodiment.

FIG. 15A is a diagram illustrating a screen on which a message for obtaining a lacking first parameter is displayed, according to an embodiment. According to an embodiment, as illustrated in FIG. 15A, the intelligent agent 151 may output a message 1501 for obtaining a breakfast parameter, on the display 120.

In operation 1308, the intelligent agent 151 may receive a user response associated with a breakfast parameter through the display 120 or a microphone.

According to an embodiment, the intelligent agent 151 may obtain a voice input saying that "I ate soybean paste stew and half a bowl of rice", through the microphone.

According to an embodiment, operation 1303 to operation 1308 may be replaced with operation 1401 to operation 1403.

According to an embodiment, after operation 1302, in operation 1401, the application intelligent agent 145 may transmit the path rule ID corresponding to breakfast, the state ID corresponding to breakfast, and information about a lacking breakfast parameter corresponding to breakfast, a message corresponding to a breakfast parameter, the path rule ID corresponding to a wake-up time, the state ID corresponding to a wake-up time, and information about a lacking wake-up time parameter corresponding to a wake-up time, and a message corresponding to a wake-up time parameter, to the intelligent agent 151.

In operation 1402, the intelligent agent 151 may output the message for obtaining the breakfast parameter, through at least one of the display 120 or the speaker 130.

In operation 1403, the intelligent agent 151 may receive a user response associated with a breakfast parameter through the display 120 or a microphone.

After operation 1308 or operation 1403, in operation 1309, the intelligent agent 151 may transmit data associated with the user response associated with a breakfast parameter, to the intelligent server 200 through the wireless communication circuit.

In operation 1310, the intelligent server 200 may transmit a path rule to record 'soybean paste stew and half a bowl of rice' as a breakfast parameter, to the intelligent agent 151 based on the data associated with the user response.

In operation 1311, the intelligent agent 151 may transmit the received path rule and the received state ID to the execution manager module 153.

In operation 1312, the execution manager module 153 may transmit information about the operation to be executed based on the path rule and the state ID, to the execution service module 141*a*.

In operation 1313, the execution service module 141*a* may perform an operation of recording 'soybean paste stew and half a bowl of rice' as a breakfast parameter, based on information, which is received from the execution manager module 153, about an operation to be executed.

Figure 15B:
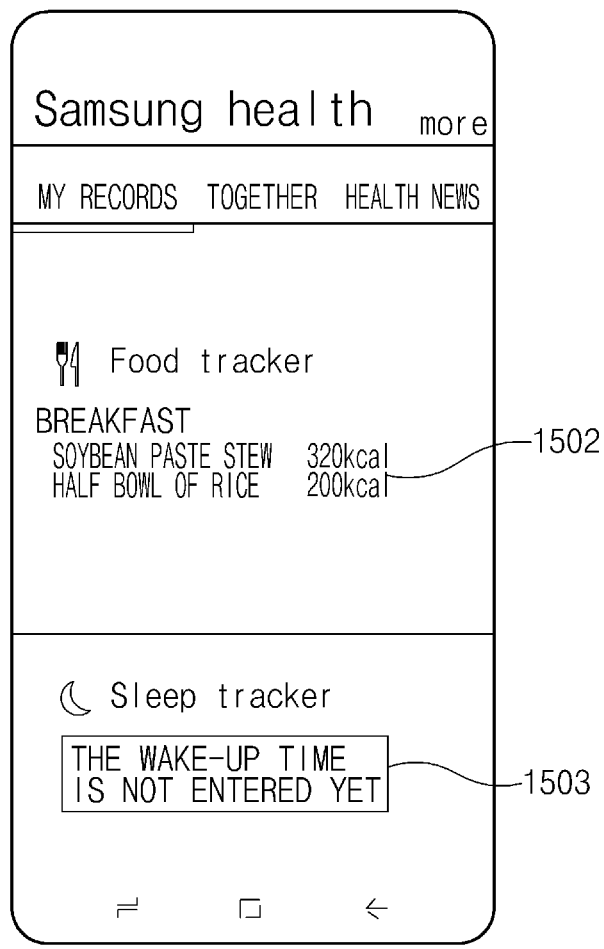
FIG. 15B is a diagram illustrating a screen of an application after a lacking first parameter is recorded, according to an embodiment.

FIG. 15B is a diagram illustrating a screen of an application after a lacking first parameter is recorded, according to an embodiment. According to an embodiment, as illustrated in FIG. 15B, the processor 150 may display a "soybean paste stew and half a bowl of rice" 1502 recorded as a breakfast parameter. According to an embodiment, since a wake-up time parameter is not recorded, as illustrated in FIG. 15B, the processor 150 may display a message 1503 saying that "the wake-up time is not entered yet".

In an embodiment, in the case where there is one parameter to be recorded, after operation 1313, operation 1314 may be performed. In an embodiment, since the wake-up time parameter is further needed to be recorded, after operation 1313, operation 1307 may be again performed to record a wake-up time parameter.

In operation 1307, the intelligent agent 151 may output the message for obtaining the wake-up time parameter, through at least one of the display 120 or the speaker 130.

Figure 16A:
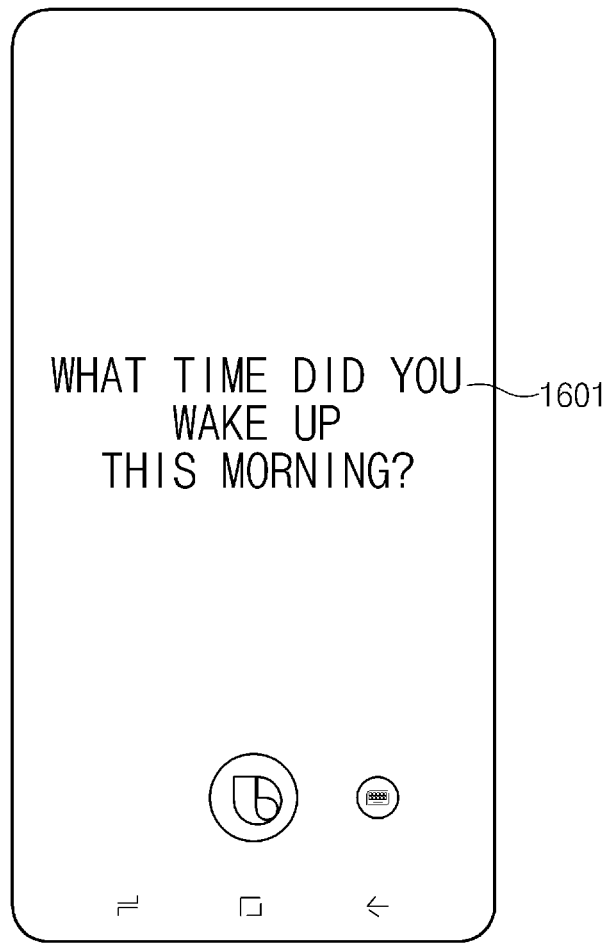
FIG. 16A is a diagram illustrating a screen on which a message for obtaining a lacking second parameter is displayed, according to an embodiment.

FIG. 16A is a diagram illustrating a screen on which a message for obtaining a lacking second parameter is displayed, according to an embodiment. According to an embodiment, as illustrated in FIG. 16A, the intelligent agent 151 may output a message 1601 for obtaining a wake-up time parameter on the display 120.

In operation 1308, the intelligent agent 151 may receive a user response associated with a wake-up time parameter through the display 120 or a microphone.

According to an embodiment, the intelligent agent 151 may obtain a voice input saying that "I got up at 7:30" through the microphone.

According to an embodiment, in the case where operation 1303 to operation 1308 are replaced with operation 1401 and operation 1403 and in the case where the wake-up time parameter is further needed to be recorded, after operation 1313, operation 1402 may be performed to record the wake-up time parameter.

According to an embodiment, in operation 1402, the intelligent agent 151 may output the message for obtaining the wake-up time parameter, through at least one of the display 120 or the speaker 130.

In operation 1403, the intelligent agent 151 may receive a user response associated with a wake-up time parameter through the display 120 or a microphone.

After operation 1308 or operation 1403, in operation 1309, the intelligent agent 151 may transmit data associated with the user response associated with the wake-up time parameter, to the intelligent server 200 through the wireless communication circuit.

In operation 1310, the intelligent server 200 may transmit a path rule to record '7:30' as the wake-up time parameter, based on data associated with the user response, to the intelligent agent 151.

In operation 1311, the intelligent agent 151 may transmit the received path rule and the received state ID to the execution manager module 153.

In operation 1312, the execution manager module 153 may transmit information about the operation to be executed based on the path rule and the state ID, to the execution service module 141a.

In operation 1313, the execution service module 141a may perform an operation of recording '7:30' as the wake-up time parameter, based on information, which is received from the execution manager module 153, about an operation to be executed.

Figure 16B:
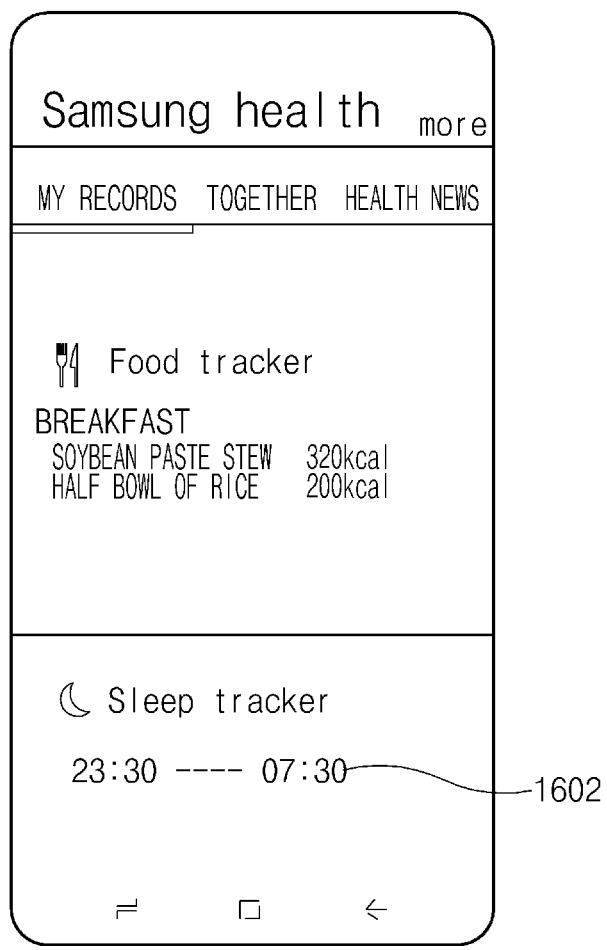
FIG. 16B is a diagram illustrating a screen of an application after a lacking second parameter is recorded, according to an embodiment.

FIG. 16B is a diagram illustrating a screen of an application after a lacking second parameter is recorded, according to an embodiment. According to an embodiment, as illustrated in FIG. 16B, the processor 150 may display '7:30' 1602 recorded as a wake-up time parameter.

After performing an operation, in operation 1314, the execution service module 141a may transmit a response for providing a notification of execution completion, to the execution manager module 153.

In operation 1315, when the registration of a breakfast parameter and a wake-up time parameter is completed, the execution manager module 153 may transmit a response for providing a notification that the registration of a breakfast parameter and a wake-up time parameter is completed, to the intelligent agent 151.

In operation 1316, the intelligent agent 151 may transmit the response for providing a notification that the registration of a breakfast parameter and a wake-up time parameter is completed, to the intelligent server 200 through the wireless communication circuit.

In operation 1317, the intelligent server 200 may generate the message for providing a notification that the registration of a breakfast parameter and a wake-up time parameter is completed, based on the response for providing a notification that the registration of a breakfast parameter and a wake-up time parameter is completed. For example, the generated message may be "the registration of a breakfast parameter and a wake-up time parameter has been completed".

In operation 1318, the intelligent server 200 may transmit the message for providing a notification that the registration of a breakfast parameter and a wake-up time parameter is completed, to the intelligent agent 151.

In operation 1319, the intelligent agent 151 may output the message for providing a notification that the registration of a breakfast parameter and a wake-up time parameter is completed, through at least one of the display 120 or the at least one speaker 130. For example, the intelligent agent 151 may display a message saying that "the registration of a breakfast parameter and a wake-up time parameter has been completed", on the display 120.

Figure 17:
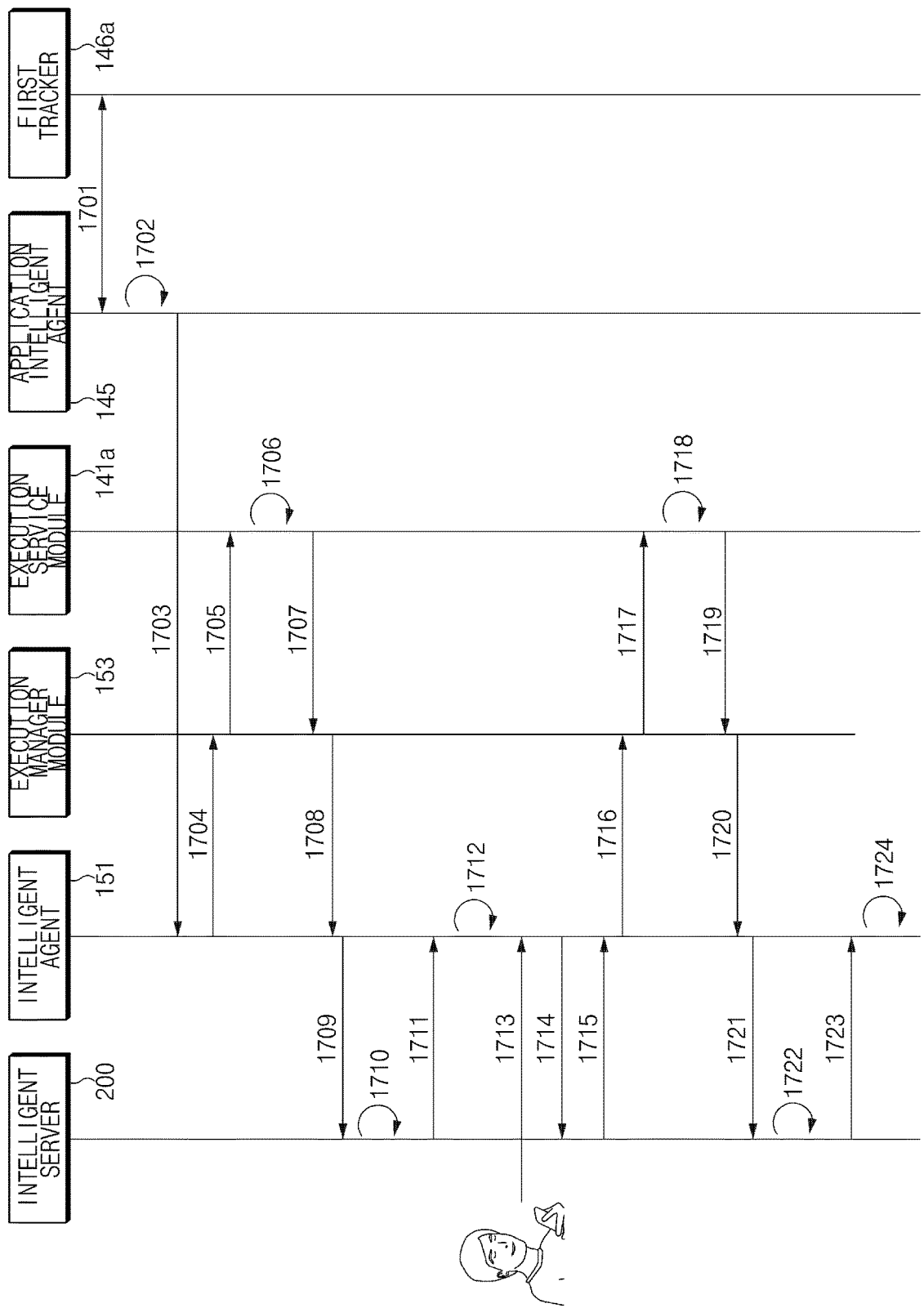
FIG. 17 is a flowchart illustrating a method of obtaining and recording a lacking parameter in an application, according to an embodiment.

FIG. 17 is a flowchart illustrating a method of obtaining and recording a lacking parameter in an application, according to an embodiment.

According to an embodiment, operations illustrated in FIG. 17 may be operations of the user terminal 100 and the intelligent server 200 for performing a method of recording a parameter, which is described with reference to FIG. 12.

According to an embodiment, the intelligent agent 151, the execution manager module 153, the execution service module 141a, the application intelligent agent 145, the first tracker 146a, and the intelligent server 200 of FIG. 17 may perform an operation at least partly similar to an operation performed by each of components described with reference to FIGS. 1 to 8.

In operation 1701, the application intelligent agent 145 may determine whether the predefined event for recording a first parameter occurs, based on information about the predefined event included in the first tracker 146a. According to an embodiment, the application intelligent agent 145 may determine whether the parameter is recorded in the first tracker DB 147a (e.g., the first tracker DB 147a of FIG. 8). In an embodiment, the application intelligent agent 145 may determine whether the first parameter associated with the generated event is included in the first tracker DB 147a. According to an embodiment, the application intelligent agent 145 may make a request for a parameter to the first tracker 146a associated with the generated predefined event and may receive one or more parameters included in the first tracker DB 147a, from the first tracker 146a. The application intelligent agent 145 may determine whether the parameter associated with the event is included in the received one or more parameters.

In the case where the predefined event occurs and in the case where the first parameter is not recorded in the first tracker DB 147a, in operation 1702, the application intelligent agent 145 may obtain path rule information corresponding to the first parameter from the second DB 148b (e.g., the second DB 148b of FIG. 8). According to an embodiment, the path rule information may include a path rule ID and a state ID, which correspond to a first parameter.

In operation 1703, the application intelligent agent 145 may transmit the path rule ID and the state ID to the intelligent agent 151.

In operation 1704, the intelligent agent 151 may transmit the path rule corresponding to the received path rule ID and the received state ID, to the execution manager module 153.

In operation 1705, the execution manager module 153 may transmit information about the operation to be executed based on the path rule and the state ID, to the execution service module 141a.

In operation 1706, the execution service module 141a may perform a part of the sequence of first states for recording a first parameter in an application. According to an embodiment, the execution service module 141a may stop at a state where the first parameter is required while performing the sequence of the first states. According to an embodiment, the execution service module 141a may obtain information about a lacking first parameter by performing a part of the sequence of the first states.

In operation 1707, the execution service module 141a may transmit information about a lacking first parameter to the execution manager module 153.

In operation 1708, the execution manager module 153 may transmit information about the lacking first parameter to the intelligent agent 151.

In operation 1709, the intelligent agent 151 may transmit the information about the lacking first parameter to the intelligent server 200 through a wireless communication circuit. According to an embodiment, the intelligent agent 151 may request the intelligent server 200 to transmit a message for obtaining the first parameter.

According to an embodiment, the intelligent agent 151 may further transmit at least one of the path rule ID or the state ID, which is transmitted in operation 1703, to the intelligent server 200 through the wireless communication circuit.

In operation 1710, the intelligent server 200 may generate the message for obtaining the first parameter, based on the received information about the first parameter.

In operation 1711, the intelligent server 200 may transmit the message for obtaining the first parameter, to the intelligent agent 151.

In operation 1712, the intelligent agent 151 may output the message for obtaining the first parameter, through at least one of the display 120 or the speaker 130.

In operation 1713, the intelligent agent 151 may receive a user response associated with a first parameter through the display 120 or a microphone.

In operation 1714, the intelligent agent 151 may transmit data associated with the user response to the intelligent server 200 through the wireless communication circuit.

In operation 1715, the intelligent server 200 may transmit a path rule based on data associated with the user response, to the intelligent agent 151.

According to an embodiment, the intelligent server 200 may determine the path rule, further based on at least one of the path rule ID or the state ID, which is received in operation 1709.

According to an embodiment, the path rule may include information about the sequence of second states for recording a first parameter. According to an embodiment, the path rule may include information about a part of the sequence of first states, which is already performed.

In operation 1716, the intelligent agent 151 may transmit the path rule and the state ID to the execution manager module 153. According to an embodiment, the intelligent agent 151 may transmit the path rule received from the intelligent server 200 and the state ID received from the application intelligent agent 145, to the execution manager module 153.

In operation 1717, the execution manager module 153 may transmit information about the operation to be executed based on the path rule and the state ID, to the execution service module 141a.

In operation 1718, the execution service module 141a may perform an operation based on information, which is received from the execution manager module 153, about an operation to be executed.

According to an embodiment, the execution service module 141a may perform the remaining part of the sequence of the first states from a state where the first parameter is required, without again performing a part of the sequence of first states, which are performed already.

After performing an operation, in operation 1719, the execution service module 141a may transmit a response for providing a notification of execution completion, to the execution manager module 153.

When all the executions of operations according to the path rule are completed, in operation 1720, the execution manager module 153 may transmit a response for providing a notification of task execution completion, to the intelligent agent 151.

In operation 1721, the intelligent agent 151 may transmit the response for providing a notification of task execution completion, to the intelligent server 200 through the wireless communication circuit.

In operation 1722, the intelligent server 200 may generate the message for providing a notification of task execution completion, based on the response for providing a notification of task execution completion.

In operation 1723, the intelligent server 200 may transmit the message for providing a notification of task execution completion, to the intelligent agent 151.

In operation 1724, the intelligent agent 151 may output the message for providing a notification of the task execution completion, through at least one of the display 120 or the at least one speaker 130.

Hereinafter, the embodiment of above-mentioned operation 1701 to operation 1724 will be described.

In operation 1701, the application intelligent agent 145 may determine that 8 a.m. for recording the first parameter elapses currently. The application intelligent agent 145 may determine that breakfast is not recorded in the first tracker DB 147a.

In operation 1702, the application intelligent agent 145 may obtain a path rule ID and a state ID, which correspond to a breakfast parameter, from the second DB 148b.

In operation 1703, the application intelligent agent 145 may transmit the path rule ID and the state ID, which correspond to breakfast, to the intelligent agent 151.

In operation 1704, the intelligent agent 151 may transmit the path rule corresponding to the received path rule ID and the received state ID, which correspond to the path rule ID corresponding to breakfast, to the execution manager module 153.

In operation 1705, the execution manager module 153 may transmit information about the operation to be executed based on the received path rule and the state ID, to the execution service module 141a.

In operation 1706, the execution service module 141a may perform a part of the sequence of first states for recording a breakfast parameter in an application and may obtain information about a lacking breakfast parameter. The execution service module 141a may obtain information about the lacking breakfast parameter by performing a part of the sequence of the first states.

In operation 1707, the execution service module 141a may transmit information about a lacking breakfast parameter to the execution manager module 153.

In operation 1708, the execution manager module 153 may transmit information about the lacking breakfast parameter to the intelligent agent 151.

In operation 1709, the intelligent agent 151 may transmit the information about the lacking breakfast parameter to the intelligent server 200 through a wireless communication circuit. According to an embodiment, the intelligent agent 151 may further transmit the path rule ID and the state ID, which correspond to breakfast, to the intelligent server 200 through the wireless communication circuit.

In operation 1710, the intelligent server 200 may generate a message (e.g., "What did you eat in the morning?") for obtaining a breakfast parameter, based on information about the received breakfast parameter.

In operation 1711, the intelligent server 200 may transmit the message for obtaining the breakfast parameter, to the intelligent agent 151.

In operation 1712, the intelligent agent 151 may output the message for obtaining the breakfast parameter, through at least one of the display 120 or the speaker 130.

In operation 1713, the intelligent agent 151 may receive a user response associated with a breakfast parameter through the display 120 or a microphone. According to an embodiment, the intelligent agent 151 may obtain a voice input saying that "I ate soybean paste stew and half a bowl of rice", through the microphone.

In operation 1714, the intelligent agent 151 may transmit data associated with the user response to the intelligent server 200 through the wireless communication circuit.

In operation 1715, the intelligent server 200 may transmit a path rule to record 'soybean paste stew and half a bowl of rice' as a breakfast parameter, to the intelligent agent 151 based on the data associated with the user response. According to an embodiment, the path rule may include information about the sequence of second states for recording a breakfast parameter, in a state where a screen for recording breakfast is displayed on the display 120.

In operation 1716, the intelligent agent 151 may transmit the path rule and the state ID to the execution manager module 153.

In operation 1717, the execution manager module 153 may transmit information about the operation to be executed based on the path rule and the state ID, to the execution service module 141a.

In operation 1718, the execution service module 141a may perform an operation of recording 'soybean paste stew and half a bowl of rice' as a breakfast parameter, based on information, which is received from the execution manager module 153, about an operation to be executed, in a state where a screen for recording breakfast is displayed on the display 120. According to an embodiment, the execution service module 141a may perform an operation of recording breakfast in a state where the screen is displayed on the display 120, without again performing an operation of executing a health application, which is already executed, and an operation of displaying a screen for recording breakfast on the display 120.

After performing an operation, in operation 1719, the execution service module 141a may transmit a response for providing a notification of execution completion, to the execution manager module 153.

In operation 1720, when the registration of a breakfast parameter is completed, the execution manager module 153 may transmit a response for providing a notification that the registration of a breakfast parameter is completed, to the intelligent agent 151.

In operation 1721, the intelligent agent 151 may transmit the response for providing a notification that the registration of a breakfast parameter is completed, to the intelligent server 200 through the wireless communication circuit.

In operation 1722, the intelligent server 200 may generate the message for providing a notification that the registration of a breakfast parameter is completed, based on the response for providing a notification that the registration of a breakfast parameter is completed.

In operation 1723, the intelligent server 200 may transmit the message for providing a notification that the registration of a breakfast parameter is completed, and the message for providing a notification of task execution completion, to the intelligent agent 151.

In operation 1724, the intelligent agent 151 may output the message for providing a notification that the registration of a breakfast parameter is completed, through at least one of the display 120 or the at least one speaker 130. For example, the intelligent agent 151 may display a message saying that "the registration of a breakfast parameter has been completed", on the display 120.

Figure 18:
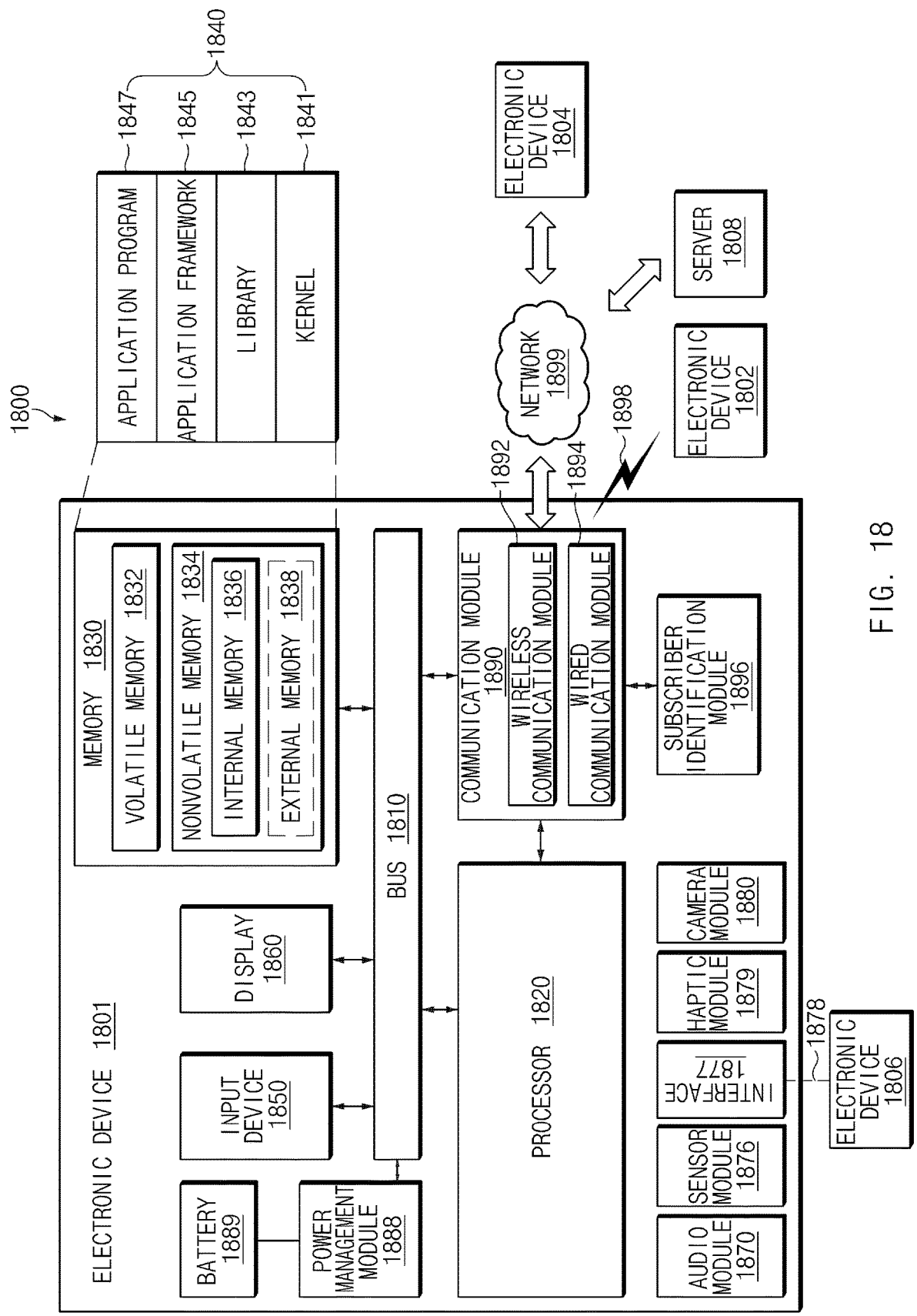
FIG. 18 is a block diagram illustrating an electronic device in a network environment, according to various embodiments.

FIG. 18 is a block diagram illustrating an electronic device 1801 in a network environment 1800, according to various embodiments. An electronic device according to various embodiments of the present disclosure may include various forms of devices. For example, the electronic device may include, without limitation, at least one of, for example, portable communication devices (e.g., smartphones), computer devices (e.g., personal digital assistants (PDAs), tablet personal computers (PCs), laptop PCs, desktop PCs, workstations, or servers), portable multimedia devices (e.g., electronic book readers or Motion Picture Experts Group (MPEG-1 or MPEG-2) Audio Layer 3 (MP3) players), portable medical devices (e.g., heartbeat measuring devices, blood glucose monitoring devices, blood pressure measuring devices, and body temperature measuring devices), cameras, and/or wearable devices, or the like. The wearable device may include, for example, and without limitation, at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), and/or a bio-implantable type (e.g., an implantable circuit), or the like. According to various embodiments, the electronic device may include at least one of, for example, and without limitation, televisions (TVs), digital versatile disk (DVD) players, audios, audio accessory devices (e.g., speakers, headphones, or headsets), refrigerators, air conditioners, cleaners, ovens, microwave ovens, washing machines, air cleaners, set-top boxes, home automation control panels, security control panels, game consoles, electronic dictionaries, electronic keys, camcorders, and/or electronic picture frames, or the like.

In another embodiment, the electronic device may include, for example, and without limitation, at least one of navigation devices, satellite navigation system (e.g., Global Navigation Satellite System (GNSS)), event data recorders (EDRs) (e.g., black box for a car, a ship, or a plane), vehicle infotainment devices (e.g., head-up display for vehicle), industrial or home robots, drones, automated teller machines (ATMs), points of sales (POSs), measuring instruments (e.g., water meters, electricity meters, or gas meters), and/or internet of things (e.g., light bulbs, sprinkler devices, fire alarms, thermostats, or street lamps), or the like. The electronic device according to an embodiment of the present disclosure may not be limited to the above-described devices, and may provide functions of a plurality of devices like smartphones which have measurement function of personal biometric information (e.g., heart rate or blood glucose). In the present disclosure, the term "user" may refer to a person who uses an electronic device or may refer to a device (e.g., an artificial intelligence electronic device) that uses the electronic device.

Referring to FIG. 18, under the network environment 1800 (e.g., the user terminal 100), the electronic device 1801 may communicate with an electronic device 1802 through local wireless communication 1898 or may communication with an electronic device 1804 or a server 1808 (e.g., the intelligent server 200) through a network 1899. According to an embodiment, the electronic device 1801 may communicate with the electronic device 1804 through the server 1808.

According to an embodiment, the electronic device 1801 may include a bus 1810, a processor (e.g., including processing circuitry) 1820 (e.g., the processor 150), a memory 1830 (e.g., the memory 140), an input device (e.g., including input circuitry) 1850 (e.g., a micro-phone or a mouse), a display device 1860, an audio module (e.g., including audio circuitry) 1870, a sensor module 1876, an interface (e.g., including interface circuitry) 1877, a haptic module (e.g., including haptic circuitry) 1879, a camera module 1880, a power management module 1888, a battery 1889, a communication module (e.g., including communication circuitry) 1890, and a subscriber identification module 1896. According to an embodiment, the electronic device 1801 may not include at least one (e.g., the display device 1860 or the camera module 1880) of the above-described components or may further include other component(s).

The bus 1810 may interconnect the above-described components 1820 to 1890 and may include a circuit for conveying signals (e.g., a control message or data) between the above-described components.

The processor 1820 may include various processing circuitry, such as, for example, and without limitation, one or more of a dedicated processor, a central processing unit (CPU), an application processor (AP), a graphic processing unit (GPU), an image signal processor (ISP) of a camera and/or a communication processor (CP), or the like. According to an embodiment, the processor 1820 may be implemented with a system on chip (SoC) or a system in package (SiP). For example, the processor 1820 may drive an operating system (OS) or an application program to control at least one of another component (e.g., hardware or software component) of the electronic device 1801 connected to the processor 1820 and may process and compute various data. The processor 1820 may load a command or data, which is received from at least one of other components (e.g., the communication module 1890), into a volatile memory 1832 to process the command or data and may store the result data into a nonvolatile memory 1834.

The memory 1830 may include, for example, the volatile memory 1832 and/or the nonvolatile memory 1834. The volatile memory 1832 may include, for example, a random access memory (RANI) (e.g., a dynamic RAM (DRAM), a static RAM (SRAM), or a synchronous DRAM (SDRAM)). The nonvolatile memory 1834 may include, for example, a programmable read-only memory (PROM), an one time PROM (OTPROM), an erasable PROM (EPROM), an electrically EPROM (EEPROM), a mask ROM, a flash ROM, a flash memory, a hard disk drive (HDD), or a solid-state drive (SSD). In addition, the nonvolatile memory 1834 may be configured in the form of an internal memory 1836 or the form of an external memory 1838 which is available through connection only if necessary, according to the connection with the electronic device 1801. The external memory 1838 may further include a flash drive such as compact flash (CF), secure digital (SD), micro secure digital (Micro-SD), mini secure digital (Mini-SD), extreme digital (xD), a multimedia card (MMC), or a memory stick. The external memory 1838 may be operatively or physically connected with the electronic device 1801 in a wired manner (e.g., a cable or a universal serial bus (USB)) or a wireless (e.g., Bluetooth) manner.

For example, the memory 1830 may store, for example, at least one different software component, such as a command or data associated with the program 1840, of the electronic device 1801. The program 1840 may include, for example, a kernel 1841, a library 1843, an application framework 1845 and/or an application program (interchangeably, "application") 1847.

The input device 1850 may include various input circuitry, such as, for example, and without limitation, a microphone, a mouse, and/or a keyboard, or the like. According to an embodiment, the keyboard may include a keyboard physically connected or a virtual keyboard displayed through the display device 1860.

The display device 1860 may include a display, a hologram device or a projector, and a control circuit to control a relevant device. The display may include, for example, and without limitation, a liquid crystal display (LCD), a light emitting diode (LED) display, an organic LED (OLED) display, a microelectromechanical systems (MEMS) display, and/or an electronic paper display, or the like. According to an embodiment, the display may be flexibly, transparently, or wearably implemented. The display may include a touch circuitry, which is able to detect a user's input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 1801.

The audio module 1870 may include various audio circuitry and convert, for example, from a sound into an electrical signal or from an electrical signal into the sound. According to an embodiment, the audio module 1870 may obtain sound through the input device 1850 (e.g., a microphone) or may output sound through an output device (not illustrated) (e.g., a speaker or a receiver) included in the electronic device 1801, an external electronic device (e.g., the electronic device 1802 (e.g., a wireless speaker or a wireless headphone)) or an electronic device 1806 (e.g., a wired speaker or a wired headphone) connected with the electronic device 1801

The sensor module 1876 may measure or detect, for example, an internal operating state (e.g., power or temperature) of the electronic device 1801 or an external environment state (e.g., an altitude, a humidity, or brightness) to generate an electrical signal or a data value corresponding to the information of the measured state or the detected state. The sensor module 1876 may include, for example, and without limitation, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint senor, a heartbeat rate monitoring (HRM) sensor, an e-nose sensor, an electromyography (EMG) sensor, an electroencephalogram (EEG) sensor, an electrocardiogram (ECG) sensor), a temperature sensor, a humidity sensor, an illuminance sensor, and/or an UV sensor, or the like. The sensor module 1876 may further include a control circuit for controlling at least one or more sensors included therein. According to an embodiment, the electronic device 1801 may control the sensor module 1876 using the processor 1820 or a processor (e.g., a sensor hub) separate from the processor 1820. In the case that the separate processor (e.g., a sensor hub) is used, while the processor 1820 is in a sleep state, the separate processor may operate without awakening the processor 1820 to control at least a portion of the operation or the state of the sensor module 1876.

According to an embodiment, the interface 1877 may include various interface circuitry, such as, for example, and without limitation, a high definition multimedia interface (HDMI), a universal serial bus (USB), an optical interface, a recommended standard 232 (RS-232), a D-subminiature (D-sub), a mobile high-definition link (MHL) interface, a SD card/MMC (multi-media card) interface, and/or an audio interface, or the like. A connector 1878 may physically connect the electronic device 1801 and the electronic device 1806. According to an embodiment, the connector 1878 may include, for example, an USB connector, an SD card/MMC connector, or an audio connector (e.g., a headphone connector).

The haptic module 1879 may convert an electrical signal into mechanical stimulation (e.g., vibration or motion) or into electrical stimulation. For example, the haptic module 1879 may apply tactile or kinesthetic stimulation to a user.

The haptic module 1879 may include various haptic circuitry, such as, for example, and without limitation, a motor, a piezoelectric element, and/or an electric stimulator, or the like.

The camera module 1880 may capture, for example, a still image and a moving picture. According to an embodiment, the camera module 1880 may include at least one lens (e.g., a wide-angle lens and a telephoto lens, or a front lens and a rear lens), an image sensor, an image signal processor, or a flash (e.g., a light emitting diode or a xenon lamp).

The power management module 1888, which is to manage the power of the electronic device 1801, may constitute at least a portion of a power management integrated circuit (PMIC).

The battery 1889 may include a primary cell, a secondary cell, or a fuel cell and may be recharged by an external power source to supply power at least one component of the electronic device 1801.

The communication module 1890 may include various communication circuitry and establish a communication channel between the electronic device 1801 and an external device (e.g., the first external electronic device 1802, the second external electronic device 1804, or the server 1808). The communication module 1890 may support wired communication or wireless communication through the established communication channel. According to an embodiment, the communication module 1890 may include a wireless communication module 1892 or a wired communication module 1894. The communication module 1890 may communicate with the external device through a first network 1898 (e.g. a wireless local area network such as Bluetooth or infrared data association (IrDA)) or a second network 1899 (e.g., a wireless wide area network such as a cellular network) through a relevant module among the wireless communication module 1892 or the wired communication module 1894.

The wireless communication module 1892 may support, for example, cellular communication, local wireless communication, global navigation satellite system (GNSS) communication. The cellular communication may include, for example, long-term evolution (LTE), LTE Advance (LTE-A), code division multiple access (CDMA), wideband CDMA (WCDMA), universal mobile telecommunications system (UMTS), Wireless Broadband (WiBro), or Global System for Mobile Communications (GSM). The local wireless communication may include wireless fidelity (Wi-Fi), Wi-Fi Direct, light fidelity (Li-Fi), Bluetooth, Bluetooth low energy (BLE), Zigbee, near field communication (NFC), magnetic secure transmission (MST), radio frequency (RF), or a body area network (BAN). The GNSS may include at least one of a Global Positioning System (GPS), a Global Navigation Satellite System (Glonass), Beidou Navigation Satellite System (Beidou), the European global satellite-based navigation system (Galileo), or the like. In the present disclosure, "GPS" and "GNSS" may be interchangeably used.

According to an embodiment, when the wireless communication module 1892 supports cellar communication, the wireless communication module 1892 may, for example, identify or authenticate the electronic device 1801 within a communication network using the subscriber identification module (e.g., a SIM card) 1896. According to an embodiment, the wireless communication module 1892 may include a communication processor (CP) separate from the processor 1820 (e.g., an application processor (AP)). In this case, the communication processor may perform at least a portion of functions associated with at least one of components 1810 to 1896 of the electronic device 1801 in substitute for the processor 1820 when the processor 1820 is in an inactive (sleep) state, and together with the processor 1820 when the processor 1820 is in an active state. According to an embodiment, the wireless communication module 1892 may include a plurality of communication modules, each supporting only a relevant communication scheme among cellular communication, local wireless communication, or a GNSS communication.

The wired communication module 1894 may include, for example, a local area network (LAN) service, a power line communication, or a plain old telephone service (POTS).

For example, the first network 1898 may employ, for example, Wi-Fi direct or Bluetooth for transmitting or receiving commands or data through wireless direct connection between the electronic device 1801 and the first external electronic device 1802. The second network 1899 may include a telecommunication network (e.g., a computer network such as a LAN or a WAN, the Internet or a telephone network) for transmitting or receiving commands or data between the electronic device 1801 and the second electronic device 1804.

According to various embodiments, the commands or the data may be transmitted or received between the electronic device 1801 and the second external electronic device 1804 through the server 1808 connected with the second network 1899. Each of the first and second external electronic devices 1802 and 1804 may be a device of which the type is different from or the same as that of the electronic device 1801. According to various embodiments, all or a part of operations that the electronic device 1801 will perform may be executed by another or a plurality of electronic devices (e.g., the electronic devices 1802 and 1804 or the server 1808). According to an embodiment, in the case that the electronic device 1801 executes any function or service automatically or in response to a request, the electronic device 1801 may not perform the function or the service internally, but may alternatively or additionally transmit requests for at least a part of a function associated with the electronic device 1801 to any other device (e.g., the electronic device 1802 or 1804 or the server 1808). The other electronic device (e.g., the electronic device 1802 or 1804 or the server 1808) may execute the requested function or additional function and may transmit the execution result to the electronic device 1801. The electronic device 1801 may provide the requested function or service using the received result or may additionally process the received result to provide the requested function or service. To this end, for example, cloud computing, distributed computing, or client-server computing may be used.

According to an embodiment of the present disclosure, an electronic device may include a housing, a touchscreen display disposed in the housing, a microphone disposed in the housing, a speaker disposed in the housing, a wireless communication circuit disposed in the housing, a processor disposed in the housing and electrically connected to the touchscreen display, the microphone, the speaker, and the wireless communication circuit; and a memory disposed inside the housing and electrically connected to the processor. The memory may store an application for monitoring user information, and the memory may store instructions that, when executed by the processor, cause the electronic device to record a plurality of parameters associated with the user information into the application automatically and/or based on a user input, to output a message for obtaining a first parameter through at least one of the touchscreen display and/or the speaker when a predefined event occurs to record the first parameter and the first parameter is not recorded into the application, to receive a user response associated with the first parameter through the touchscreen display and/or the microphone, to transmit data associated with the user response to an external server through the wireless communication circuit, to receive a first response from the external server through the wireless communication circuit, and to record the first parameter into the application by allowing the electronic device to have information about sequences of states of the electronic device. The first response may include information about sequences of states of the electronic device for recording the first parameter into the application.

In an embodiment, the predefined event may include at least one of an event associated with a time, an event associated with biometric information of a user, and/or an event associated with a location of the electronic device.

In an embodiment, the instructions, when executed by the processor, may cause the electronic device to output the message when a condition associated with context information of a user is satisfied.

In an embodiment, the condition may include a condition associated with biometric information of the user.

In an embodiment, before outputting the message for obtaining the first parameter, the instructions, when executed by the processor, may cause the electronic device to transmit information about the first parameter which is lacking to the external server through the wireless communication circuit, to receive the message for obtaining the first parameter from the external server through the wireless communication circuit, and to output the received message for obtaining the first parameter through at least one of the touchscreen display and/or the speaker.

In an embodiment, the memory may store the message for obtaining the first parameter, and the instructions may, when executed by the processor, cause the electronic device to output the stored message.

In an embodiment, the instructions may, when executed by the processor, cause the electronic device to display a specified object on the touchscreen display; and to output the message when a second user input to select the object is received.

In an embodiment, when displaying the object, the instructions, when executed by the processor, cause the electronic device to output at least one of a sound notification and/or a vibration notification.

In an embodiment, the instructions, when executed by the processor, may cause the electronic device to transmit a second response including information about registration completion of the first parameter after recording the first parameter, to the external server through the wireless communication circuit, to receive a message for providing a notification of the registration completion of the first parameter from the external server through the wireless communication circuit, and to output the message for providing the notification of the registration completion of the first parameter through at least one of the touchscreen display and/or the speaker.

According to an embodiment of the present disclosure, an electronic device may include a housing, a touchscreen display disposed in the housing, a microphone disposed in the housing, a speaker disposed in the housing, a wireless communication circuit disposed in the housing, a processor disposed in the housing and electrically connected to the touchscreen display, the microphone, the speaker, and the wireless communication circuit, and a memory disposed inside the housing and electrically connected to the processor. The memory may store an application for monitoring user information, and the memory may store instructions that, when executed by the processor, cause the electronic device to record a plurality of parameters associated with the user information into the application automatically and/or based on a user input, to perform a part of a sequence of first states for recording a first parameter into the application when an event associated with the first parameter occurs and the first parameter is not recorded into the application, and to transmit information including lack of the first parameter in a state where the first parameter is required, to an external server through the wireless communication circuit, to receive a message for obtaining the first parameter from the external server through the wireless communication circuit, to output the received message for obtaining the first parameter through at least one of the touchscreen display and/or the speaker, to receive a user response associated with the first parameter through the touchscreen display and/or the microphone, to transmit data associated with the user response to the external server through the wireless communication circuit, to receive a response from the external server through the wireless communication circuit, and to perform a remaining part of the sequence of the first states by allowing the electronic device to have information of sequences of second states. The response may include information about sequences of second states of the electronic device for recording the first parameter into the application.

In an embodiment, the predefined event may include at least one of an event associated with a time, an event associated with biometric information of a user, and/or an event associated with a location of the electronic device.

In an embodiment, the instructions may, when executed by the processor, cause the electronic device to output the message when a condition associated with context information of a user is satisfied.

In an embodiment, the condition may include a condition associated with biometric information of the user.

In an embodiment, the instructions may, when executed by the processor, cause the electronic device to display a specified object on the touchscreen display; and when a second user input to select the object is received, to output the message.

In an embodiment, when displaying the object, the instructions cause the processor to output at least one of a sound notification or a vibration notification.

According to an embodiment of the present disclosure, a computer-readable recording medium may store instructions which, when executed by a processor of an electronic device, cause the electronic device to record a plurality of parameters associated with user information in an application automatically and/or based on a user input, to output a message for obtaining a first parameter through at least one of a touchscreen display and/or a speaker when a predefined event occurs to record the first parameter and the first parameter is not recorded into the application, to receive a user response associated with the first parameter through the touchscreen display and/or a microphone, to transmit data associated with the user response to an external server through a wireless communication circuit, to receive a first response from the external server through the wireless communication circuit, and to record the first parameter into the application by allowing the electronic device to have information about sequences of states of the electronic device. The first response may include information about sequences of states of the electronic device for recording the first parameter into the application.

In an embodiment, the predefined event may include at least one of an event associated with a time, an event associated with biometric information of a user, and/or an event associated with a location of the electronic device.

In an embodiment, the instructions, when executed by the processor of the electronic device, may cause the electronic device further to transmit information about the first parameter, which is lacking, to the external server through the wireless communication circuit, to receive the message for obtaining the first parameter from the external server through the wireless communication circuit, and to output the received message for obtaining the first parameter, through the touchscreen display or the speaker.

In an embodiment, the instructions, when executed by the processor of the electronic device, may cause the electronic device further to display a specified object on the touchscreen display, and when a second user input to select the object is received, to output the message.

In an embodiment, the instructions, when executed by the processor of the electronic device, may cause the electronic device further, after recording the first parameter, to transmit a second response including information about registration completion of the first parameter, to the external server through the wireless communication circuit, to receive a message for providing a notification of the registration completion of the first parameter, from the external server through the wireless communication circuit, and to output the message for providing the notification of the registration completion of the first parameter, through at least one of the touchscreen display or the speaker.

Various embodiments of the present disclosure and terms used herein are not intended to limit the technologies described in the present disclosure to specific embodiments, and it should be understood that the embodiments and the terms include modifications, equivalents, and/or alternatives of the corresponding embodiments described herein. With regard to description of drawings, similar components may be marked by similar reference numerals. The terms of a singular form may include plural forms unless otherwise specified. In the disclosure disclosed herein, the expressions "A or B", "at least one of A and/or B", "A, B, or C", or "at least one of A, B, and/or C", and the like used herein may include any and all combinations of one or more of the associated listed items. Expressions such as "first," or "second," and the like, may be used to express their components regardless of their priority or importance and may be used to distinguish one component from another component but is not limited to these components. When an (e.g., first) component is referred to as being "(operatively or communicatively) coupled with/to" or "connected to" another (e.g., second) component, it may be directly coupled with/to or connected to the other component or an intervening component (e.g., a third component) may be present.

According to the situation, the expression "adapted to or configured to" used herein may be interchangeably used as, for example, the expression "suitable for", "having the capacity to", "changed to", "made to", "capable of" or "designed to" in hardware or software or any combinations thereof. The expression "a device configured to" may refer to a situation in which the device is "capable of" operating together with another device or other parts. For example, a "processor configured to (or set to) perform A, B, and C" may refer, for example, and without limitation, to a dedicated processor (e.g., an embedded processor) for performing corresponding operations, a generic-purpose processor (e.g., a central processing unit (CPU), an application processor (AP)), or the like which performs corresponding operations by executing one or more software programs which are stored in a memory device (e.g., the memory 1830).

The term "module" used herein may include a unit, which is implemented with hardware, software, or firmware, or any combinations thereof and may be interchangeably used with the terms "logic", "logical block", "part", "circuit", or the like. The "module" may be a minimum unit of an integrated part or a part thereof or may be a minimum unit for performing one or more functions or a part thereof. The "module" may be implemented mechanically or electronically and may include, for example, and without limitation, a dedicated processor, a CPU, an application-specific IC (ASIC) chip, a field-programmable gate array (FPGA), and/or a programmable-logic device for performing some operations, or the like, which are known or will be developed.

At least a part of an apparatus (e.g., modules or functions thereof) or a method (e.g., operations) according to various embodiments may be, for example, implemented by instructions stored in a computer-readable storage media (e.g., the memory 1830) in the form of a program module. The instruction, when executed by a processor (e.g., the processor 1820), may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The one or more instructions may contain a code made by a compiler and/or a code executable by an interpreter.

Each component (e.g., a module or a program module) according to various embodiments may include a single entity or a plurality of entities, a part of the above-described sub-components may be omitted, or other sub-components may be further included. Alternatively or additionally, after being integrated in one entity, some components (e.g., a module or a program module) may identically or similarly perform the function executed by each corresponding component before integration. According to various embodiments, operations executed by modules, program modules, or other components may be executed by a successive method, a parallel method, a repeated method, or a heuristic method, or at least one part of operations may be executed in different sequences or omitted. Alternatively, other operations may be added.

While the present disclosure has been illustrated and described with reference to various example embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a touchscreen display;
a microphone;
a speaker;
a wireless communication circuit;
at least one processor electrically connected to the touchscreen display, the microphone, the speaker, and the wireless communication circuit; and
a memory electrically connected to the at least one processor, wherein the memory stores an application for monitoring user information, and wherein the memory stores instructions that, when executed by the at least one processor, are configured to cause the electronic device to:
record a plurality of parameters received from a plurality of sensors and associated with the user information into the application automatically each time a predefined event occurs, wherein each of the plurality of parameters is associated with the predefined event and the plurality of parameters includes a sleep time parameter associated with at least one of a wake time, a bed time, or a sleep time of a user;
recognize the predefined event for automatically recording the plurality of parameters;
recognize that a predetermined parameter associated with the recognized event is not automatically recorded into the application among the plurality of parameters recorded in response to the predefined event being recognized;
display a specified object on the touchscreen display for indicating a user that the predetermined parameter has not been recorded in response to recognizing the predefined event and that the predetermined parameter is not automatically recorded into the application in response to recognizing the predefined event;
receive a user input to select the specified object through the touchscreen display;
output a message for obtaining the predetermined parameter through at least one of the touchscreen display and/or the speaker in response to receiving the user input;
in response to outputting the message, receive a user response including the predetermined parameter through the microphone;
transmit data associated with the user response to an external server through the wireless communication circuit;
receive a first response from the external server through the wireless communication circuit, wherein the first response includes information about sequences of states of the electronic device for recording the predetermined parameter included in the user response into the application; and
record the predetermined parameter into the application by allowing the electronic device to have information about the sequences of the states.

2. The electronic device of claim 1, wherein the predefined event includes at least one of: an event associated with a time, an event associated with biometric information of the user, and/or an event associated with a location of the electronic device.

3. The electronic device of claim 1, wherein the instructions, when executed by the at least one processor, cause the electronic device to:
output the message when a condition associated with context information of the user is satisfied.

4. The electronic device of claim 3, wherein the condition includes a condition associated with biometric information of the user.

5. The electronic device of claim 1, wherein the instructions, when executed by the at least one processor, cause the electronic device to:
before outputting the message for obtaining the predetermined parameter that is not recorded,
transmit information about the predetermined parameter that is not recorded to the external server through the wireless communication circuit,
receive the message for obtaining the predetermined parameter that is not recorded from the external server through the wireless communication circuit, and
output the received message for obtaining the predetermined parameter that is not recorded, through at least one of the touchscreen display and/or the speaker.

6. The electronic device of claim 1, wherein the memory stores the message for obtaining the predetermined parameter that is not recorded, and
wherein the instructions, when executed by the at least one processor, cause the electronic device to:
output the stored message.

7. The electronic device of claim 1, wherein the instructions, when executed by the at least one processor, cause the electronic device to:
output at least one of a sound notification and/or a vibration notification when displaying the specified object.

8. The electronic device of claim 1, wherein the instructions, when executed by the at least one processor, cause the electronic device to:
transmit a second response including information about registration completion of the predetermined parameter to the external server through the wireless communication circuit after recording the predetermined parameter;
receive a message for providing a notification of the registration completion of the predetermined parameter from the external server through the wireless communication circuit; and
output the message for providing the notification of the registration completion of the predetermined parameter, through at least one of the touchscreen display and/or the speaker.

9. An electronic device comprising:
a touchscreen display;
a microphone;
a speaker;
a wireless communication circuit;
at least one processor electrically connected to the touchscreen display, the microphone, the speaker, and the wireless communication circuit; and
a memory electrically connected to the at least one processor, wherein the memory stores an application for monitoring user information, and wherein the memory stores instructions that, when executed by the at least one processor, cause the electronic device to:
record a plurality of parameters received from a plurality of sensors and associated with the user information into the application automatically each time a predefined event occurs, wherein each of the plurality of parameters is associated with the predefined event and the plurality of parameters includes a sleep time parameter associated with at least one of a wake time, a bed time, or a sleep time of a user;
recognize the predefined event for automatically recording the plurality of parameters;
recognize that a predetermined parameter associated with the recognized event is not automatically recorded into the application among the plurality of parameters recorded in response to the predefined event being recognized;
display a specified object on the touchscreen display for indicating a user that the predetermined parameter has not been recorded in response to recognizing the predefined event and that the predetermined parameter is not automatically recorded into the application in response to recognizing the predefined event;
receive a user input to select the specified object through the touchscreen display;
perform a part of a sequence of first states for recording the predetermined parameter into the application in response to receiving the user input; and
in a state where the predetermined parameter is required,
transmit information including lack of the predetermined parameter, to an external server through the wireless communication circuit,
receive a message for obtaining the predetermined parameter from the external server through the wireless communication circuit,
output the received message for obtaining the predetermined parameter, through at least one of the touchscreen display and/or the speaker,
receive a user response including the predetermined parameter through the microphone,
transmit data associated with the user response to the external server through the wireless communication circuit,
receive a response from the external server through the wireless communication circuit, wherein the response includes information about sequences of second states of the electronic device for recording the predetermined parameter included in the user response into the application, and
perform the remaining part of the sequence of the first states by allowing the electronic device to have the information about the sequences of the second states.

10. The electronic device of claim 9, wherein the event associated with the predetermined parameter includes at least one of: an event associated with a time, an event associated with biometric information of the user, and/or an event associated with a location of the electronic device.

11. The electronic device of claim 9, wherein the instructions, when executed by the at least one processor, cause the electronic device to:
output the message when a condition associated with context information of the user is satisfied.

12. The electronic device of claim 11, wherein the condition includes a condition associated with biometric information of the user.

13. The electronic device of claim 9, wherein the instructions, when executed by the at least one processor, cause the electronic device to:
output at least one of a sound notification and/or a vibration notification when displaying the specified object.

14. A non-transitory computer-readable recording medium storing instructions which, when executed by at least one processor of an electronic device, cause the electronic device to:
record a plurality of parameters received from a plurality of sensors and associated with user information into an application automatically each time a predefined event occurs, wherein each of the plurality of parameters is associated with the predefined event and the plurality of parameters includes a sleep time parameter associated with at least one of a wake time, a bed time, or a sleep time of a user;
recognize the predefined event for automatically recording the plurality of parameters;
recognize that a predetermined parameter associated with the recognized event is not automatically recorded into the application among the plurality of parameters recorded in response to the predefined event being recognized;
display a specified object on a touchscreen display of the electronic device for indicating a user that the predetermined parameter has not been recorded in response to recognizing the predefined event and that the predetermined parameter is not automatically recorded into the application in response to recognizing the predefined event;
receive a user input to select the specified object through the touchscreen display;
output a message for obtaining a predetermined parameter through at least one of a touchscreen display and/or a speaker in response to receiving the user input;
in response to outputting the message, receive a user response including the predetermined parameter through the touchscreen display and/or a microphone;
transmit data associated with the user response to an external server through a wireless communication circuit;
receive a first response from the external server through the wireless communication circuit, wherein the first response includes information about sequences of states of the electronic device for recording the predetermined parameter included in the user response into the application; and
record the predetermined parameter into the application by allowing the electronic device to have information about the sequences of the states.

15. The computer-readable recording medium of claim 14, wherein the predefined event includes at least one of: an event associated with a time, an event associated with biometric information of the user, and/or an event associated with a location of the electronic device.

16. The computer-readable recording medium of claim 14, wherein the instructions, when executed by at least one processor of the electronic device, cause the electronic device further to:
transmit information about the predetermined parameter that is not recorded to the external server through the wireless communication circuit;
receive the message for obtaining the predetermined parameter from the external server through the wireless communication circuit; and
output the received message for obtaining the predetermined parameter, through the touchscreen display and/or the speaker.

17. The computer-readable recording medium of claim 14, wherein the instructions, when executed by at least one processor of the electronic device, cause the electronic device further to:
transmit a second response including information about registration completion of the predetermined parameter, to the external server through the wireless communication circuit after recording the predetermined parameter;
receive a message for providing a notification of the registration completion of the predetermined parameter from the external server through the wireless communication circuit; and
output the message for providing the notification of the registration completion of the predetermined parameter through at least one of the touchscreen display and/or the speaker.

* * * * *